US012183252B2

(12) United States Patent
Park et al.

(10) Patent No.: US 12,183,252 B2
(45) Date of Patent: Dec. 31, 2024

(54) DISPLAY DEVICE AND METHOD OF OPERATING THE SAME

(71) Applicant: LG Display Co., Ltd., Seoul (KR)

(72) Inventors: JiHoon Park, Paju-si (KR); EuiYeol Oh, Seoul (KR); DongHoon Cha, Paju-si (KR); SungBok Yu, Seoul (KR); Changeui Hong, Cheonan-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/864,915

(22) Filed: Jul. 14, 2022

(65) Prior Publication Data

US 2023/0070335 A1 Mar. 9, 2023

(30) Foreign Application Priority Data

Sep. 7, 2021 (KR) ........................ 10-2021-0119392

(51) Int. Cl.
*G09G 3/20* (2006.01)
*G09G 3/3233* (2016.01)

(52) U.S. Cl.
CPC ......... *G09G 3/2092* (2013.01); *G09G 3/2033* (2013.01); *G09G 3/3233* (2013.01);
(Continued)

(58) Field of Classification Search
CPC ............... G09G 3/2033; G09G 3/3233; G09G 2320/0285; G09G 2320/043;
(Continued)

(56) References Cited

U.S. PATENT DOCUMENTS 10,818,240 B2 10/2020 Park
10,847,599 B2 11/2020 Jeon et al.
(Continued)

FOREIGN PATENT DOCUMENTS

CN 109064996 A 12/2018
CN 110675744 A 1/2020
(Continued)

OTHER PUBLICATIONS

China National Intellectual Property Administration, Office Action, Chinese Patent Application No. 202210971351.1, Mar. 21, 2024, 16 pages.

(Continued)

*Primary Examiner* — William Boddie
*Assistant Examiner* — Saifeldin E Elnafia
(74) *Attorney, Agent, or Firm* — Fenwick & West LLP

(57) ABSTRACT

A display device and method of operating the display device is disclosed. The display device and method accurately compensate for the degradation of subpixels by monitoring the degradation in real time using an optical electronic device located under, or at a lower portion of, a display panel and partially overlapping an optical area in the display area. Such monitoring of the degradation can be performed in real time using such an optical element or device even in a situation where the display device is used, and the compensation of the degradation can be performed in real time in accordance with the result of the monitoring.

17 Claims, 21 Drawing Sheets

(52) U.S. Cl.
CPC ............... *G09G 2320/0285* (2013.01); *G09G 2320/043* (2013.01); *G09G 2320/048* (2013.01); *G09G 2360/145* (2013.01); *G09G 2360/16* (2013.01)

(58) Field of Classification Search
CPC ....... G09G 2320/048; G09G 2360/145; G09G 2360/16; G09G 3/2092
See application file for complete search history.

(56) References Cited

U.S. PATENT DOCUMENTS

| | | | | |
|---|---|---|---|---|
| 11,145,249 | B1 | 10/2021 | Han et al. | |
| 11,532,690 | B2 | 12/2022 | Liu et al. | |
| 11,653,535 | B2 | 5/2023 | Jeon et al. | |
| 11,899,862 | B2 | 2/2024 | Bok et al. | |
| 11,930,676 | B2 | 3/2024 | Liu et al. | |
| 2014/0176409 | A1 | 6/2014 | Kim et al. | |
| 2020/0098843 | A1 | 3/2020 | Jeon et al. | |
| 2020/0160789 | A1* | 5/2020 | Park | G09G 3/3233 |
| 2021/0043716 | A1 | 2/2021 | Jeon et al. | |
| 2021/0056912 | A1* | 2/2021 | Park | G09G 3/2092 |
| 2021/0191552 | A1* | 6/2021 | Bok | G06F 1/1652 |
| 2021/0193785 | A1 | 6/2021 | Kim et al. | |
| 2021/0233976 | A1* | 7/2021 | Lee | H10K 71/00 |
| 2022/0059003 | A1* | 2/2022 | Hack | G09G 3/2003 |
| 2022/0069052 | A1 | 3/2022 | Liu et al. | |
| 2022/0359635 | A1 | 11/2022 | Han et al. | |
| 2023/0127411 | A1 | 4/2023 | Liu et al. | |
| 2024/0023397 | A1 | 1/2024 | Liu et al. | |

FOREIGN PATENT DOCUMENTS

| | | | |
|---|---|---|---|
| CN | 110718190 | A | 1/2020 |
| CN | 110942752 | A | 3/2020 |
| CN | 110956925 | A | 4/2020 |
| CN | 111199698 | A | 5/2020 |
| CN | 111370458 | A | 7/2020 |
| CN | 111627378 | A | 9/2020 |
| CN | 112562586 | A | 3/2021 |
| CN | 113035910 | A | 6/2021 |
| KR | 10-2016-0098551 | A | 8/2016 |

OTHER PUBLICATIONS

China National Intellectual Property Administration, Office Action, Chinese Patent Application No. 202210971351.1, Aug. 12, 2024, 17 pages.

* cited by examiner

DISPLAY DEVICE AND METHOD OF OPERATING THE SAME

CROSS-REFERENCE TO RELATED APPLICATION

This application claims the priority benefit of Republic of Korea Patent Application No. 10-2021-0119392, filed on Sep. 7, 2021 in the Korean Intellectual Property Office, which is incorporated by reference in its entirety.

BACKGROUND

Field of the Disclosure

The present disclosure relates to electronic devices, and more specifically, to a display device and a method of operating the display device.

Description of the Background

In a typical display device, to compensate for degradation of elements included in a subpixel disposed in a display panel, such as, a light emitting element, transistors, and the like, optical compensation has been performed using a camera, or the like during the process of manufacturing the display panel. In such an optical compensation method, luminance from the subpixel can be accurately measure using the camera, and therefore, the level of corresponding degradation at the time of manufacturing the display panel can be accurately determined.

After the display panel is manufactured and the display device is launched, as the display device is used, the elements included in the subpixel age and become less efficient. However, the degradation of the light emitting element, and the like in the subpixel cannot be monitored, and as a result, it has been problematic to compensate for corresponding degradation in accordance with situations where such elements are used.

SUMMARY

In the field of current display technology, the monitoring of degradation levels of elements included in a subpixel of a display panel, such as a light emitting element, transistors, and the like, using an optical element or device in a situation where the display panel or a display device including the display panel is used by a user is not available after the display device is manufactured, but is available only during manufacturing of the display device. Therefore, in the field of current display technology, there has been an increasingly need for monitoring, and compensating for, the degradation of such elements using an optical element or device with high accuracy in real time after the display panel is manufactured.

To address these issues, a display device and a method of operating the display device for monitoring the degradation of subpixels in real time using an optical element or device even in a situation where the display device is used by a user after the display device is manufactured, and for compensating for the degradation in real time in accordance with the result of the monitoring is disclosed.

In one embodiment, a display device comprises: a display panel comprising a display area including a plurality of light emitting areas corresponding to a plurality of subpixels, and a non-display area located outside of the display area; one or more optical electronic devices located under, or at a lower portion of, the display panel; and a data driving circuit configured to supply a data voltage corresponding to input image data to the display panel, wherein the display area comprises one or more optical areas that partially overlap the one or more optical electronic devices, and a non-optical area located outside of the one or more optical areas, wherein the one or more optical areas comprises a plurality of first light emitting areas of the plurality of light emitting areas and a plurality of light transmission areas, and the non-optical area comprises a plurality of second light emitting areas of the plurality of light emitting areas, and wherein the one or more optical electronic devices overlaps at least a portion of the plurality of first light emitting areas in the one or more optical areas, and performs an image capturing operation or a sensing operation through the one or more optical areas during one of a first period in which the display device is not used or a second period proceeded by an input related to screen setting.

In one embodiment, a method of operating a display device comprising a display panel comprising a display area comprising a plurality of light emitting areas corresponding to a plurality of subpixels, and a non-display area located outside of the display area, a data driving circuit configured to supply a data voltage corresponding to input image data to the display panel, and one or more optical electronic devices, the method comprising: determining whether the display device operates in a first period in which the display device is not used or a second period proceeded by an input related to screen setting; and executing an image capturing operation or a sensing operation by the one or more optical electronic devices through one or more optical areas during the first period or the second period, wherein the display area comprises one or more optical areas partially overlapping the one or more optical electronic devices, and a non-optical area located outside of the one or more optical areas, wherein the one or more optical areas comprises a plurality of first light emitting areas of the plurality of light emitting areas and a plurality of light transmission areas, and the non-optical area comprises a plurality of second light emitting areas of the plurality of light emitting areas, and wherein the one or more optical electronic devices overlap at least a portion of the plurality of first light emitting areas in the one or more optical areas.

In one embodiment, a display device comprises: a display panel including a first optical area and a non-optical area that are configured to display an image, the first optical area comprising a first plurality of light emitting areas and a first plurality of light transmission areas, and the non-optical area including a second plurality of light emitting areas; and a first electronic device configured to sense light through the first plurality of light transmission areas, the first electronic device under the display panel or located at a lower portion of the display panel and overlapping the first optical area but not the non-optical area.

BRIEF DESCRIPTION OF THE DRAWINGS

The accompanying drawings, which are included to provide a further understanding of the disclosure and are incorporated in and constitute a part of the disclosure, illustrate embodiments of the disclosure and together with the description serve to explain the principle of the disclosure. In the drawings.

DETAILED DESCRIPTION

Figure 1A:
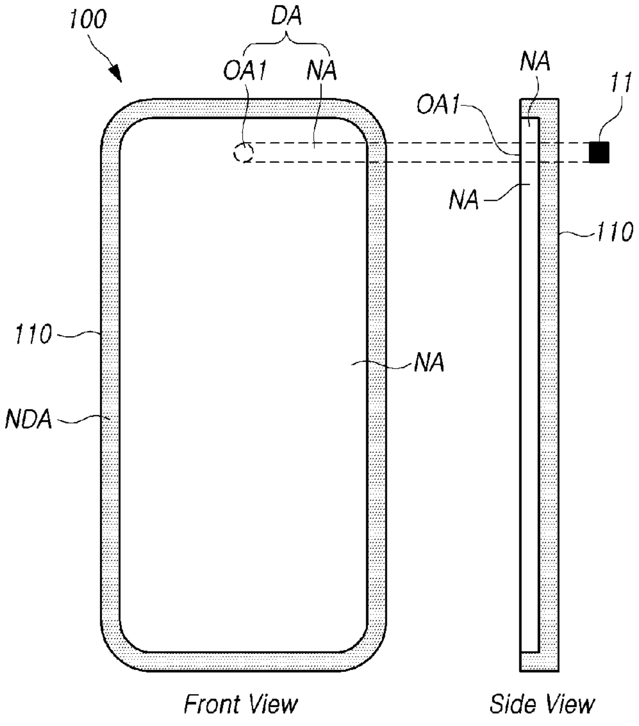
FIGS. 1A, 1B, and 1C are plan views illustrating a display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the present disclosure will be described in detail with reference to the accompanying drawings.

Figure 1B:
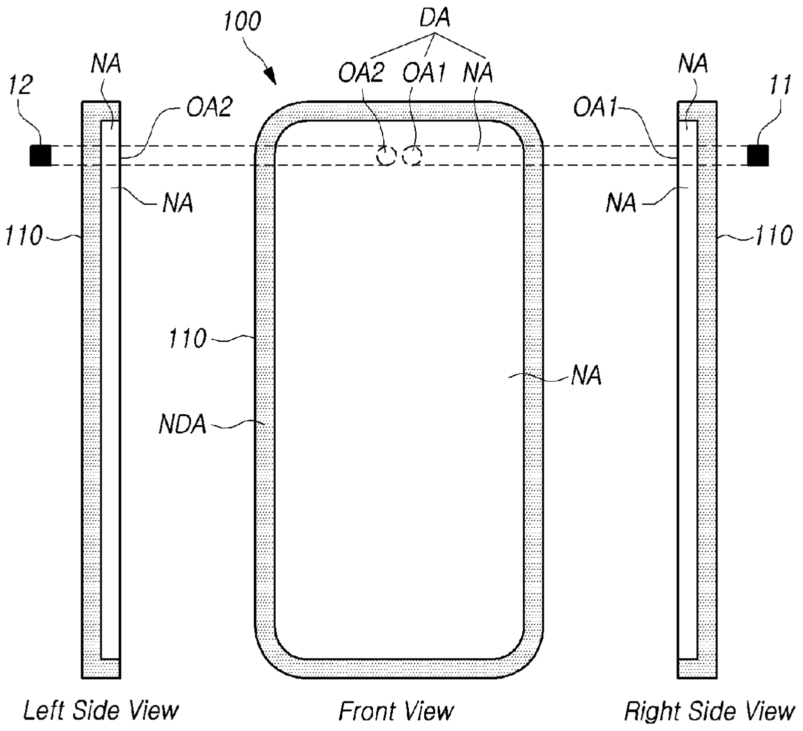
Figure 1C:
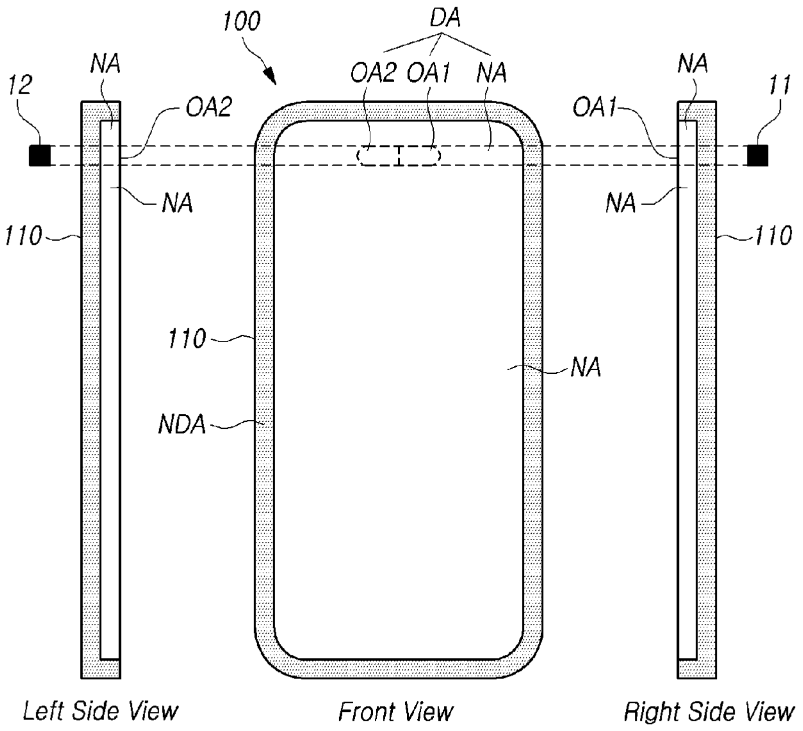

FIGS. 1A, 1B and 1C are plan views illustrating a display device 100 according to embodiments of the present disclosure.

Referring to FIGS. 1A, 1B, and 1C, the display device 100 according to embodiments of the present disclosure can include a display panel 110 for displaying images, and one or more optical electronic devices (11, 12).

The display panel 110 can include a display area DA in which an image is displayed and a non-display area NDA in which an image is not displayed.

A plurality of subpixels can be arranged in the display area DA, and several types of signal lines for driving the plurality of subpixels can be arranged therein.

The non-display area NDA may refer to an area outside of the display area DA. Several types of signal lines can be arranged in the non-display area NDA, and several types of driving circuits can be connected thereto. At least a portion of the non-display area NDA may be bent to be invisible from the front of the display panel or may be covered by a case (not shown) of the display panel 110 or the display device 100. The non-display area NDA may be also referred to as a bezel or a bezel area.

Referring to FIGS. 1A, 1B, and 1C, in the display device 100 according to embodiments of the present disclosure, the one or more optical electronic devices (11, 12) may be located under, or in a lower portion of, the display panel 110 (an opposite side to the viewing surface thereof).

Light can enter the front surface (viewing surface) of the display panel 110, pass through the display panel 110, reach the one or more optical electronic devices (11, 12) located under, or in the lower portion of, the display panel 110 (the opposite side to the viewing surface).

The one or more optical electronic devices (11, 12) can receive or detect light transmitting through the display panel 110 and perform a predefined function based on the received light. For example, the one or more optical electronic devices (11, 12) may include one or more of an image capture device such as a camera (an image sensor), and/or the like, and a sensor such as a proximity sensor, an illuminance sensor, and/or the like.

Referring to FIGS. 1A, 1B, and 1C, in some embodiments, the display area DA of the display panel 110 may include one or more optical areas (OA1, OA2) and a non-optical area NA.

Referring to FIGS. 1A, 1B, and 1C, the one or more optical areas (OA1, OA2) may be one or more areas overlapping the one or more optical electronic devices (11, 12). The non-optical area NA is an area that does not overlap with one or more optical electronic devices (11, 12) and may also be referred to as a normal area.

According to an example of FIG. 1A, the display area DA may include a first optical area OA1 and a non-optical area NA. In some embodiments, at least a portion of the first optical area OA1 may overlap a first optical electronic device 11.

According to an example of FIG. 1B, the display area DA may include a first optical area OA1, a second optical area OA2, and a non-optical area NA. In the example of FIG. 1B, at least a portion of the non-optical area NA may be present between the first optical area OA1 and the second optical area OA2. In some embodiments, at least a portion of the first optical area OA1 may overlap the first optical electronic device 11, and at least a portion of the second optical area OA2 may overlap a second optical electronic device 12.

According to an example of FIG. 1C, the display area DA may include a first optical area OA1, a second optical area OA2, and a non-optical area NA. In the example of FIG. 1C, the non-optical area NA may not be present between the first optical area OA1 and the second optical area OA2. For example, the first optical area OA1 and the second optical area OA2 may contact each other. In some embodiments, at least a portion of the first optical area OA1 may overlap the first optical electronic device 11, and at least a portion of the second optical area OA2 may overlap the second optical electronic device 12.

Both an image display structure and a light transmission structure are needed to be formed in the one or more optical areas (OA1, OA2). In some embodiments, since the one or more optical areas (OA1, OA2) are one or more portions of the display area DA, subpixels for displaying images are needed to be disposed in the one or more optical areas (OA1, OA2). Further, for enabling light to transmit the one or more optical electronic devices (11, 12), a light transmission structure is needed to be formed in the one or more optical areas (OA1, OA2).

According to the embodiments described above, in spite of a fact that the one or more optical electronic devices (11, 12) are needed to receive or detect light, the one or more optical electronic devices (11, 12) are sometimes located on the back of the display panel 110 (under, or in the lower portion of, the display panel 110, i.e., the opposite side to the viewing surface), and thereby, can receive light that has transmitted the display panel 110.

For example, the one or more optical electronic devices (11, 12) may not be exposed in the front surface (viewing surface) of the display panel 110. Accordingly, when a user looks at the front of the display device 110, the one or more optical electronic devices (11, 12) are invisible to the user.

In one embodiment, the first optical electronic device 11 may be a camera, and the second optical electronic device 12 may be a sensor such as a proximity sensor, an illuminance sensor, and/or the like. For example, the sensor may be an infrared sensor capable of detecting infrared rays.

In another embodiment, the first optical electronic device 11 may be a sensor, and the second optical electronic device 12 may be a camera.

Hereinafter, for convenience of description, discussions will be conducted on the embodiment where the first optical electronic device 11 is a camera, and the second optical electronic device 12 is a sensor such as a proximity sensor, an illuminance sensor, an infrared sensor, and the like. For example, the camera may be a camera lens, an image sensor, or a unit including at least one of the camera lens and the image sensor.

In a case where the first optical electronic device 11 is the camera, this camera may be located on the back of (under, or in the lower portion of) the display panel 110, and be a front camera capable of capturing objects in a front direction of the display panel 110. Accordingly, the user can capture an image through the camera that is not visible on the viewing surface while looking at the viewing surface of the display panel 110.

Although the non-optical area NA and the one or more optical areas (OA1, OA2) included in the display area DA in each of FIGS. 1A to 1C are areas where images can be displayed, the non-optical area NA is an area that lacks a light transmission structure need not be formed, but the one or more optical areas (OA1, OA2) are areas that include the light transmission structure.

Accordingly, the one or more optical areas (OA1, OA2) may have a transmittance greater than or equal to a predetermined level, (e.g., a relatively high transmittance), and the non-optical area NA may not have light transmittance or have a transmittance less than the predetermined level (e.g., a relatively low transmittance).

For example, the one or more optical areas (OA1, OA2) may have a resolution, a subpixel arrangement structure, the number of subpixels per unit area, an electrode structure, a line structure, an electrode arrangement structure, a line arrangement structure, or/and the like different from that/those of the non-optical area NA.

In one embodiment, the number of subpixels per unit area in the one or more optical areas (OA1, OA2) may be less than the number of subpixels per unit area in the non-optical area NA. For example, the resolution of the one or more optical areas (OA1, OA2) may be less than that of the non-optical area NA. Here, the number of subpixels per unit area may be a unit for measuring resolution, for example, referred to as pixels per inch (PPI), which represents the number of pixels within 1 inch.

In one embodiment, in each of FIGS. 1A to 1C, the number of subpixels per unit area in the first optical areas OA1 may be less than the number of subpixels per unit area in the non-optical area NA. In one embodiment, in each of FIGS. 1B and 1C, the number of subpixels per unit area in the second optical areas OA2 may be greater than or equal to the number of subpixels per unit area in the first optical areas OA1.

In each of FIGS. 1A to 1C, the first optical area OA1 may have various shapes, such as a circle, an ellipse, a quadrangle, a hexagon, an octagon or the like. In each of FIGS. 1B to 1C, the second optical area OA2 may have various shapes, such as a circle, an ellipse, a quadrangle, a hexagon, an octagon or the like. The first optical area OA1 and the second optical area OA2 may have the same shape or different shapes.

Referring to FIG. 1C, in a case where the first optical area OA1 and the second optical area OA2 contact each other, the entire optical area including the first optical area OA1 and the second optical area OA2 may also have various shapes, such as a circle, an ellipse, a quadrangle, a hexagon, an octagon or the like.

Hereinafter, for convenience of description, discussions will be conducted based on an embodiment in which each of the first optical area OA1 and the second optical area OA2 has a circular shape.

Herein, in a case where the display device 100 according to embodiments of the present disclosure has a structure in which the first optical electronic device 11 located to be covered under, or in the lower portion of, the display panel 100 without being exposed to the outside is a camera, the display device 100 may be referred to as a display (or display device) to which under-display camera (UDC) technology is applied.

The display device 100 according to this configuration can have an advantage of preventing the size of the display area DA from being reduced since a notch or a camera hole for exposing a camera need not be formed in the display panel 110.

Since the notch or the camera hole for camera exposure need not be formed in the display panel 110, the display device 100 can have further advantages of reducing the size of the bezel area, and improving the degree of freedom in design as such limitations to the design are removed.

Although the one or more optical electronic devices (11, 12) are covered on the back of (under, or in the lower portion of) the display panel 110 in the display device 100 according to embodiments of the present disclosure, that is, hidden not to be exposed to the outside, the one or more optical electronic devices (11, 12) needed to receive or detect light for normally performing predefined functionality.

Further, in the display device 100 according to embodiments of the present disclosure, although the one or more optical electronic devices (11, 12) are covered on the back of (under, or in the lower portion of) the display panel 110 and located to overlap the display area DA, it is necessary for image display to be normally performed in the one or more optical areas (OA1, OA2) overlapping the one or more optical electronic devices (11, 12) in the area DA.

Figure 2:
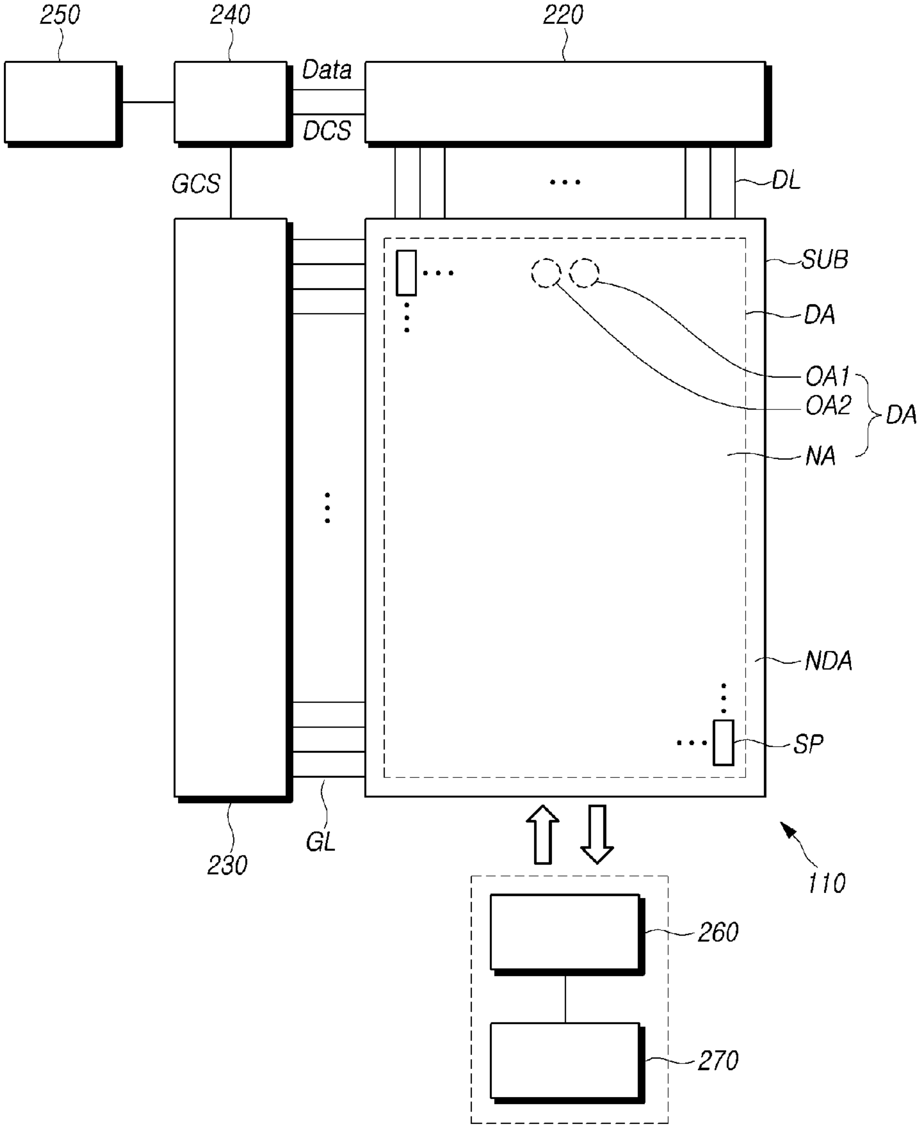
FIG. 2 illustrates a system configuration of the display device according to embodiments of the present disclosure.

FIG. 2 illustrates a system configuration of a display device 100 according to embodiments of the present disclosure.

Referring to FIG. 2, the display device 100 can include the display panel 110 and a display driving circuit as components for displaying an image.

The display driving circuit is a circuit for driving the display panel 110, and can include a data driving circuit 220, a gate driving circuit 230, a display controller 240, and the like.

The display panel 110 can include a display area DA in which an image is displayed and a non-display area NDA in which an image is not displayed. The non-display area NDA may be an area outside of the display area DA, and may also be referred to as an edge area or a bezel area. All or a portion of the non-display area NDA may be an area visible from the front surface of the display device 100, or an area that is bent and invisible from the front surface of the display device 100.

The display panel 110 can include a substrate SUB and a plurality of subpixels SP disposed on the substrate SUB. The display panel 110 can further include various types of signal lines to drive the plurality of subpixels SP.

In some embodiments, the display device 100 herein may be a liquid crystal display device, or the like, or a self-emission display device in which light is emitted from the display panel 110 itself. In some embodiments, when the display device 100 is the self-emission display device, each of the plurality of subpixels SP may include a light emitting element.

In some embodiments, the display device 100 may be an organic light emitting display device in which the light emitting element is implemented using an organic light emitting diode (OLED). In some embodiments, the display device 100 may be an inorganic light emitting display device in which the light emitting element is implemented using an inorganic material-based light emitting diode. In some embodiments, the display device 100 may be a quantum dot display device in which the light emitting element is implemented using quantum dots, which are self-emission semiconductor crystals.

The structure of each of the plurality of subpixels SP may vary according to types of the display devices 100. For example, when the display device 100 is a self-emission display device including self-emission subpixels SP, each subpixel SP may include a self-emission light emitting element, one or more transistors, and one or more capacitors.

The various types of signal lines arranged in the display device 100 may include, for example, a plurality of data lines DL for carrying data signals (also referred to as data voltages or image signals), a plurality of gate lines GL for carrying gate signals (also referred to as scan signals), and the like.

The plurality of data lines DL and the plurality of gate lines GL may intersect each other. Each of the plurality of data lines DL may be disposed to extend in a first direction. Each of the plurality of gate lines GL may be disposed to extend in a second direction.

For example, the first direction may be a column or vertical direction, and the second direction may be a row or horizontal direction. In another example, the first direction may be the row direction, and the second direction may be the column direction.

The data driving circuit 220 is a circuit for driving the plurality of data lines DL, and can supply data signals to the plurality of data lines DL. The gate driving circuit 230 is a circuit for driving the plurality of gate lines GL, and can supply gate signals to the plurality of gate lines GL.

The display controller 240 is a device for controlling the data driving circuit 220 and the gate driving circuit 230, and can control driving timing for the plurality of data lines DL and driving timing for the plurality of gate lines GL.

The display controller 240 can supply a data driving control signal DCS to the data driving circuit 220 to control the data driving circuit 220, and supply a gate driving control signal GCS to the gate driving circuit 230 to control the gate driving circuit 230.

The display controller 240 can receive input image data from a host system 250 and supply image data Data to the data driving circuit 220 based on the input image data.

The data driving circuit 220 can supply data signals to the plurality of data lines DL according to the driving timing control of the display controller 240.

The data driving circuit 220 can receive the digital image data Data from the display controller 240, convert the received image data Data into analog data signals, and supply the resulting analog data signals to the plurality of data lines DL.

The gate driving circuit 230 can supply gate signals to the plurality of gate lines GL according to the timing control of the display controller 240. The gate driving circuit 230 can receive a first gate voltage corresponding to a turn-on level voltage and a second gate voltage corresponding to a turn-off level voltage along with various gate driving control signals GCS, generate gate signals, and supply the generated gate signals to the plurality of gate lines GL.

In some embodiments, the data driving circuit 220 may be connected to the display panel 110 in a tape automated bonding (TAB) type, or connected to a conductive pad such as a bonding pad of the display panel 110 in a chip on glass (COG) type or a chip on panel (COP) type, or connected to the display panel 110 in a chip on film (COF) type.

In some embodiments, the gate driving circuit 230 may be connected to the display panel 110 in the tape automated bonding (TAB) type, or connected to a conductive pad such as a bonding pad of the display panel 110 in the chip on glass (COG) type or the chip on panel (COP) type, or connected to the display panel 110 in the chip on film (COF) type. In another embodiment, the gate driving circuit 230 may be disposed in the non-display area NDA of the display panel 110 in a gate in panel (GIP) type. The gate driving circuit 230 may be disposed on or over the substrate, or connected to the substrate. That is, in the case of the GIP type, the gate driving circuit 230 may be disposed in the non-display area NDA of the substrate. The gate driving circuit 230 may be connected to the substrate in the case of the chip on glass (COG) type, the chip on film (COF) type, or the like.

At least one of the data driving circuit 220 and the gate driving circuit 230 may be disposed in the display area DA of the display panel 110. For example, at least one of the data driving circuit 220 and the gate driving circuit 230 may be disposed not to overlap subpixels SP, or disposed to be overlapped with one or more, or all, of the subpixels SP.

The data driving circuit 220 may also be located on, but not limited to, only one side or portion (e.g., an upper edge or a lower edge) of the display panel 110. In some embodiments, the data driving circuit 220 may be located in, but not limited to, two sides or portions (e.g., an upper edge and a lower edge) of the display panel 110 or at least two of four sides or portions (e.g., the upper edge, the lower edge, a left edge, and a right edge) of the display panel 110 according to driving schemes, panel design schemes, or the like.

The gate driving circuit 230 may be located on, but not limited to, only one side or portion (e.g., a left edge or a right edge) of the display panel 110. In some embodiments, the gate driving circuit 230 may be located on, but not limited to, two sides or portions (e.g., a left edge and a right edge) of the panel 110 or at least two of four sides or portions (e.g., an upper edge, a lower edge, the left edge, and the right edge) of the panel 110 according to driving schemes, panel design schemes, or the like.

The display controller 240 may be implemented in a separate component from the data driving circuit 220, or integrated with the data driving circuit 220 and thus implemented in an integrated circuit.

The display controller 240 may be a timing controller used in the typical display technology or a controller or a control device capable of additionally performing other control functions in addition to the function of the typical timing controller. In some embodiments, the display controller 140 may be a controller or a control device different from the timing controller, or a circuitry or a component included in the controller or the control device. The display controller 240 may be implemented with various circuits or electronic components such as an integrated circuit (IC), a field programmable gate array (FPGA), an application specific integrated circuit (ASIC), a processor, and/or the like.

The display controller 240 may be mounted on a printed circuit board, a flexible printed circuit, and/or the like and be electrically connected to the gate driving circuit 220 and the data driving circuit 230 through the printed circuit board, flexible printed circuit, and/or the like.

The display controller 240 may transmit signals to, and receive signals from, the data driving circuit 220 via one or more predefined interfaces. In some embodiments, such interfaces may include a low voltage differential signaling (LVDS) interface, an EPI interface, a serial peripheral interface (SP), and the like.

In some embodiments, in order to further provide a touch sensing function, as well as an image display function, the display device 100 may include at least one touch sensor, and a touch sensing circuit capable of detecting whether a touch event occurs by a touch object such as a finger, a pen, or the like, or of detecting a corresponding touch position, by sensing the touch sensor.

The touch sensing circuit can include a touch driving circuit 260 capable of generating and providing touch sensing data by driving and sensing the touch sensor, a touch controller 270 capable of detecting the occurrence of a touch event or detecting a touch position using the touch sensing data, and the like.

The touch sensor can include a plurality of touch electrodes. The touch sensor can further include a plurality of touch lines for electrically connecting the plurality of touch electrodes to the touch driving circuit 260.

The touch sensor may be implemented in a touch panel, or in the form of a touch panel, outside of the display panel 110, or be implemented inside of the display panel 110. When the touch sensor is implemented in the touch panel, or in the form of the touch panel, outside of the display panel 110, such a touch sensor is referred to as an add-on type. When the add-on type of touch sensor is disposed, the touch panel and the display panel 110 may be separately manufactured and combined during an assembly process. The add-on type of touch panel may include a touch panel substrate and a plurality of touch electrodes on the touch panel substrate.

When the touch sensor is implemented inside of the display panel 110, the touch sensor may be disposed over the substrate SUB together with signal lines and electrodes related to display driving during the process of manufacturing the display panel 110.

The touch driving circuit 260 can supply a touch driving signal to at least one of the plurality of touch electrodes, and sense at least one of the plurality of touch electrodes to generate touch sensing data.

The touch sensing circuit can perform touch sensing using a self-capacitance sensing method or a mutual-capacitance sensing method.

When the touch sensing circuit performs touch sensing in the self-capacitance sensing method, the touch sensing circuit can perform touch sensing based on capacitance between each touch electrode and a touch object (e.g., a finger, a pen, etc.).

According to the self-capacitance sensing method, each of the plurality of touch electrodes can serve as both a driving touch electrode and a sensing touch electrode. The touch driving circuit 260 can drive all, or one or more, of the plurality of touch electrodes and sense al, or one or more, of the plurality of touch electrodes.

When the touch sensing circuit performs touch sensing in the mutual-capacitance sensing method, the touch sensing circuit can perform touch sensing based on capacitance between touch electrodes.

According to the mutual-capacitance sensing method, the plurality of touch electrodes are divided into driving touch electrodes and sensing touch electrodes. The touch driving circuit 260 can drive the driving touch electrodes and sense the sensing touch electrodes.

The touch driving circuit 260 and the touch controller 270 included in the touch sensing circuit may be implemented in separate devices or in a single device. Further, the touch driving circuit 260 and the data driving circuit 220 may be implemented in separate devices or in a single device.

The display device 100 may further include a power supply circuit for supplying various types of power to the display driving circuit and/or the touch sensing circuit.

In some embodiments, the display device 100 may be a mobile terminal such as a smart phone, a tablet, or the like, or a monitor, a television (TV), or the like. Such devices may be of various types, sizes, and shapes. The display device 100 according to embodiments of the present disclosure are not limited thereto, and includes displays of various types, sizes, and shapes for displaying information or images.

As described above, the display area DA of the display panel 110 may include a non-optical area NA and one or more optical areas (OA1, OA2), for example, as shown in FIGS. 1A to 1C.

The non-optical area NA and the one or more optical areas (OA1, OA2) are areas where an image can be displayed. However, the non-optical NA is an area in which a light transmission structure need not be implemented, and the one or more optical areas OA1, OA2 are areas in which the light transmission structure need be implemented.

As discussed above with respect to the examples of FIGS. 1A to 1C, although the display area DA of the display panel 110 may include the one or more optical areas (OA1, OA2) in addition to the non-optical area NA, for convenience of description, in the discussion that follows, it is assumed that the display area DA includes first and second optical areas (OA1, OA2) and the non-optical area NA and the non-optical area NA thereof includes the non-optical areas NAs in FIGS. 1A to 1C, and the first and second optical areas (OA1, OA2) thereof include the first optical areas OA1*s* in FIGS. 1A to 1C and the second optical areas OA2*s* of FIGS. 1B and 1C, respectively, unless explicitly stated otherwise.

Figure 3:
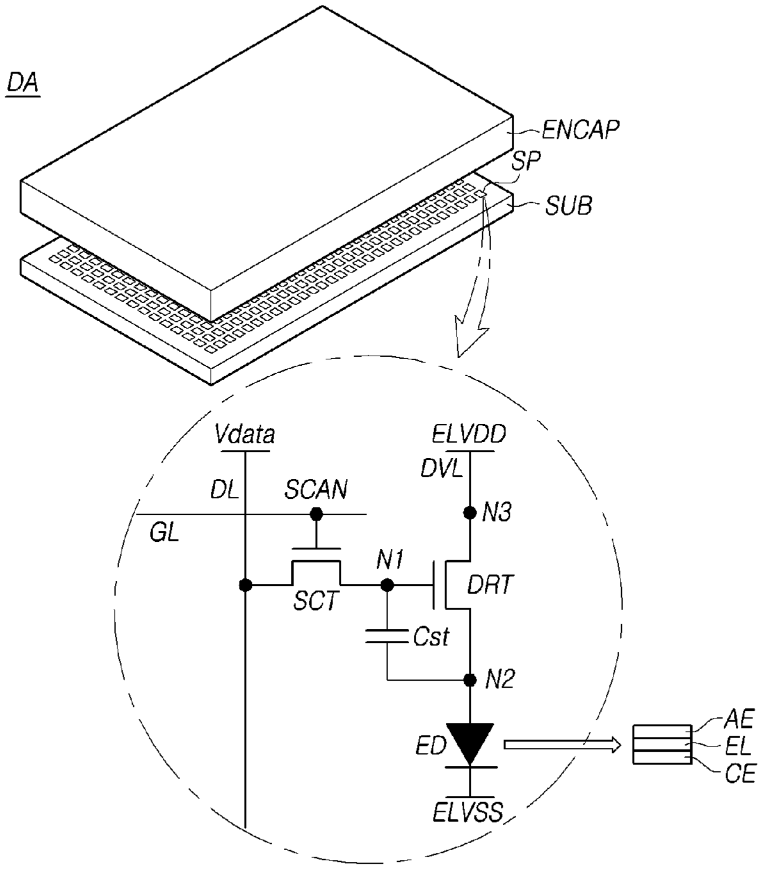
FIG. 3 illustrates an equivalent circuit of a subpixel in a display panel according to embodiments of the present disclosure.

FIG. 3 illustrates an equivalent circuit of a subpixel SP in the display panel 110 according to embodiments of the present disclosure.

Each of subpixels SP disposed in the non-optical area NA, the first optical area OA1, and the second optical area OA2 included in the display area DA of the display panel 110 may include a light emitting element ED, a driving transistor DRT for driving the light emitting element ED, a scan transistor SCT for transmitting a data voltage VDATA to a first node N1 of the driving transistor DRT, a storage capacitor Cst for maintaining a voltage at an approximate constant level during one frame, and the like.

The driving transistor DRT can include the first node N1 to which a data voltage is applied, a second node N2 electrically connected to the light emitting element ED, and a third node N3 to which a driving voltage ELVDD through a driving voltage line DVL is applied. In the driving transistor DRT, the first node N1 may be a gate node, the second node N2 may be a source node or a drain node, and the third node N3 may be the drain node or the source node.

The light emitting element ED can include an anode electrode AE, an emission layer EL, and a cathode electrode CE. The anode electrode AE may be a pixel electrode disposed in each subpixel SP, and may be electrically connected to the second node N2 of the driving transistor DRT of each subpixel SP. The cathode electrode CE may be a common electrode commonly disposed in the plurality of subpixels SP, and a base voltage ELVSS such as a low-level voltage may be applied to the cathode electrode CE.

For example, the anode electrode AE may be the pixel electrode, and the cathode electrode CE may be the common electrode. In another example, the anode electrode AE may be the common electrode, and the cathode electrode CE may be the pixel electrode. For convenience of description, in the discussion that follows, it is assumed that the anode electrode AE is the pixel electrode, and the cathode electrode CE is the common electrode unless explicitly stated otherwise.

The light emitting element ED may be, for example, an organic light emitting diode (OLED), an inorganic light emitting diode, a quantum dot light emitting element, or the like. In a case where an organic light emitting diode is used as the light emitting element ED, the emission layer EL included in the light emitting element ED may include an organic emission layer including an organic material.

The scan transistor SCT may be turned on and off by a scan signal SCAN that is a gate signal applied through a gate line GL, and be electrically connected between the first node N1 of the driving transistor DRT and a data line DL.

The storage capacitor Cst may be electrically connected between the first node N1 and the second node N2 of the driving transistor DRT.

Each subpixel SP may include two transistors (2T: DRT and SCT) and one capacitor (1C: Cst) (referred to as "2T1C structure") as shown in FIG. 3, and in some cases, may further include one or more transistors, or further include one or more capacitors.

The storage capacitor Cst may be an external capacitor intentionally designed to be located outside of the driving transistor DRT, other than an internal capacitor, such as a parasitic capacitor (e.g., a Cgs, a Cgd), that may be present between the first node N1 and the second node N2 of the driving transistor DRT.

Each of the driving transistor DRT and the scan transistor SCT may be an n-type transistor or a p-type transistor.

Since circuit elements (in particular, a light emitting element ED) in each subpixel SP are vulnerable to external moisture or oxygen, an encapsulation layer ENCAP may be disposed in the display panel 110 in order to prevent the external moisture or oxygen from penetrating into the circuit elements (in particular, the light emitting element ED). The encapsulation layer ENCAP may be disposed to cover the light emitting element ED.

Figure 4:
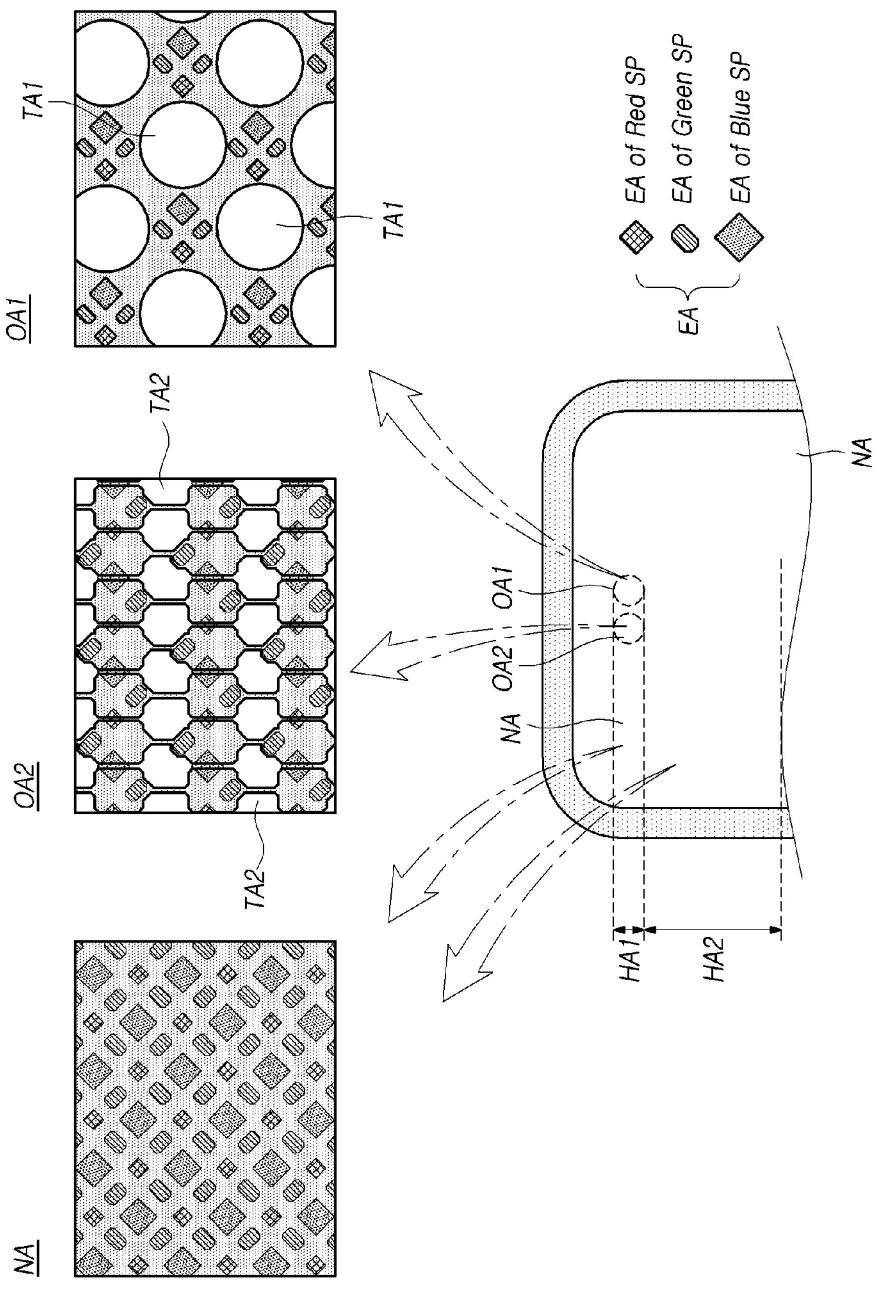
FIG. 4 illustrates arrangements of subpixels in three areas included in the display area of the display panel according to embodiments of the present disclosure.

FIG. 4 illustrates arrangements of subpixels SP in the three areas (NA, OA1, and OA2) included in the display area DA of the display panel 110 according to embodiments of the present disclosure.

Referring to FIG. 4, a plurality of subpixels SP may be disposed in each of the non-optical area NA, the first optical area OA1, and the second optical area OA2 included in the display area DA.

The plurality of subpixels SP may include, for example, a red subpixel (Red SP) emitting red light, a green subpixel (Green SP) emitting green light, and a blue subpixel (Blue SP) emitting blue light.

Accordingly, each of the non-optical area NA, the first optical area OA1, and the second optical area OA2 may include one or more light emitting areas EA of one or more red subpixels (Red SP), and one or more light emitting areas EA of one or more green subpixels (Green SP), and one or more light emitting areas EA of one or more blue subpixels (Blue SP).

Referring to FIG. 4, the non-optical area NA may not include a light transmission structure, but may include light emitting areas EA without the light transmission structure.

However, the first optical area OA1 and the second optical area OA2 include both the light emitting areas EA and the light transmission structure.

Accordingly, the first optical area OA1 can include light emitting areas EA and first transmission areas TA1 (e.g., light transmission areas), and the second optical area OA2 can include the light emitting areas EA and second transmission area TA2 (e.g., light transmission areas).

The light emitting areas EA and the transmission areas (TA1, TA2) may be distinct according to whether the transmission of light is allowed. That is, the light emitting areas EA may be areas not allowing light to transmit, and the transmission areas TA1, TA2 may be areas allowing light to transmit.

The light emitting areas EA and the transmission areas TA1, TA2 may be also distinct according to whether or not a specific metal layer CE is included. For example, the cathode electrode CE may be disposed in the light emitting areas EA, and the cathode electrode CE may not be disposed in the transmission areas (TA1, TA2). Further, a light shield layer may be disposed in the light emitting areas EA, and the light shield layer may not be disposed in the transmission areas (TA1, TA2).

Since the first optical area OA1 includes the first transmission areas TA1 and the second optical area OA2 includes the second transmission areas TA2, both of the first optical area OA1 and the second optical area OA2 are areas through which light can pass.

In one embodiment, a transmittance (a degree of transmission) of the first optical area OA1 and a transmittance (a degree of transmission) of the second optical area OA2 may be substantially equal.

For example, the first transmission area TA1 of the first optical area OA1 and the second transmission area TA2 of the second optical area OA2 may have a substantially equal shape or size. In another example, even when the first transmission area TA1 of the first optical area OA1 and the second transmission area TA2 of the second optical area OA2 have different shapes or sizes, a ratio of the first transmission area TA1 to the first optical area OA1 and a ratio of the second transmission area TA2 to the second optical area OA2 may be substantially equal.

In another embodiment, a transmittance (a degree of transmission) of the first optical area OA1 and a transmittance (a degree of transmission) of the second optical area OA2 may be different.

For example, the first transmission area TA1 of the first optical area OA1 and the second transmission area TA2 of the second optical area OA2 may have different shapes or sizes. In another example, even when the first transmission area TA1 of the first optical area OA1 and the second transmission area TA2 of the second optical area OA2 have a substantially equal shape or size, a ratio of the first transmission area TA1 to the first optical area OA1 and a ratio of the second transmission area TA2 to the second optical area OA2 may be different from each other.

For example, in a case where the first optical electronic device 11 overlapping the first optical area OA1 is a camera, and the second optical electronic device 12 overlapping the second optical area OA2 is a sensor for detecting images, the camera may need a greater amount of light than the sensor.

Thus, the transmittance (degree of transmission) of the first optical area OA1 may be greater than the transmittance (degree of transmission) of the second optical area OA2.

In this case, the first transmission area TA1 of the first optical area OA1 may have a size greater than the second transmission area TA2 of the second optical area OA2. In another example, even when the first transmission area TA1 of the first optical area OA1 and the second transmission area TA2 of the second optical area OA2 have a substantially equal size, a ratio of the first transmission area TA1 to the first optical area OA1 may be greater than a ratio of the second transmission area TA2 to the second optical area OA2.

For convenience of description, the discussion that follows is performed based on the embodiment in which the transmittance (degree of transmission) of the first optical area OA1 is greater than the transmittance (degree of transmission) of the second optical area OA2.

Further, the transmission areas (TA1, TA2) as shown in FIG. 4 may be referred to as transparent areas, and the term transmittance may be referred to as transparency.

Further, in the discussion that follows, it is assumed that the first optical areas OA1 and the second optical areas OA2 are located in an upper edge of the display area DA of the display panel 110, and are disposed to be horizontally adjacent to each other such as being disposed in a direction in which the upper edge extends, as shown in FIG. 4, unless explicitly stated otherwise.

Referring to FIG. 4, a horizontal display area in which the first optical area OA1 and the second optical area OA2 are disposed is referred to as a first horizontal display area HA1, and another horizontal display area in which the first optical area OA1 and the second optical area OA2 are not disposed is referred to as a second horizontal display area HA2.

Referring to FIG. 4, the first horizontal display area HA1 may include a portion of the non-optical area NA, the first optical area OA1, and the second optical area OA2. The second horizontal display area HA2 may include another portion of the non-optical area NA that lacks the first optical area OA1 and the second optical area OA2.

Figure 5A:
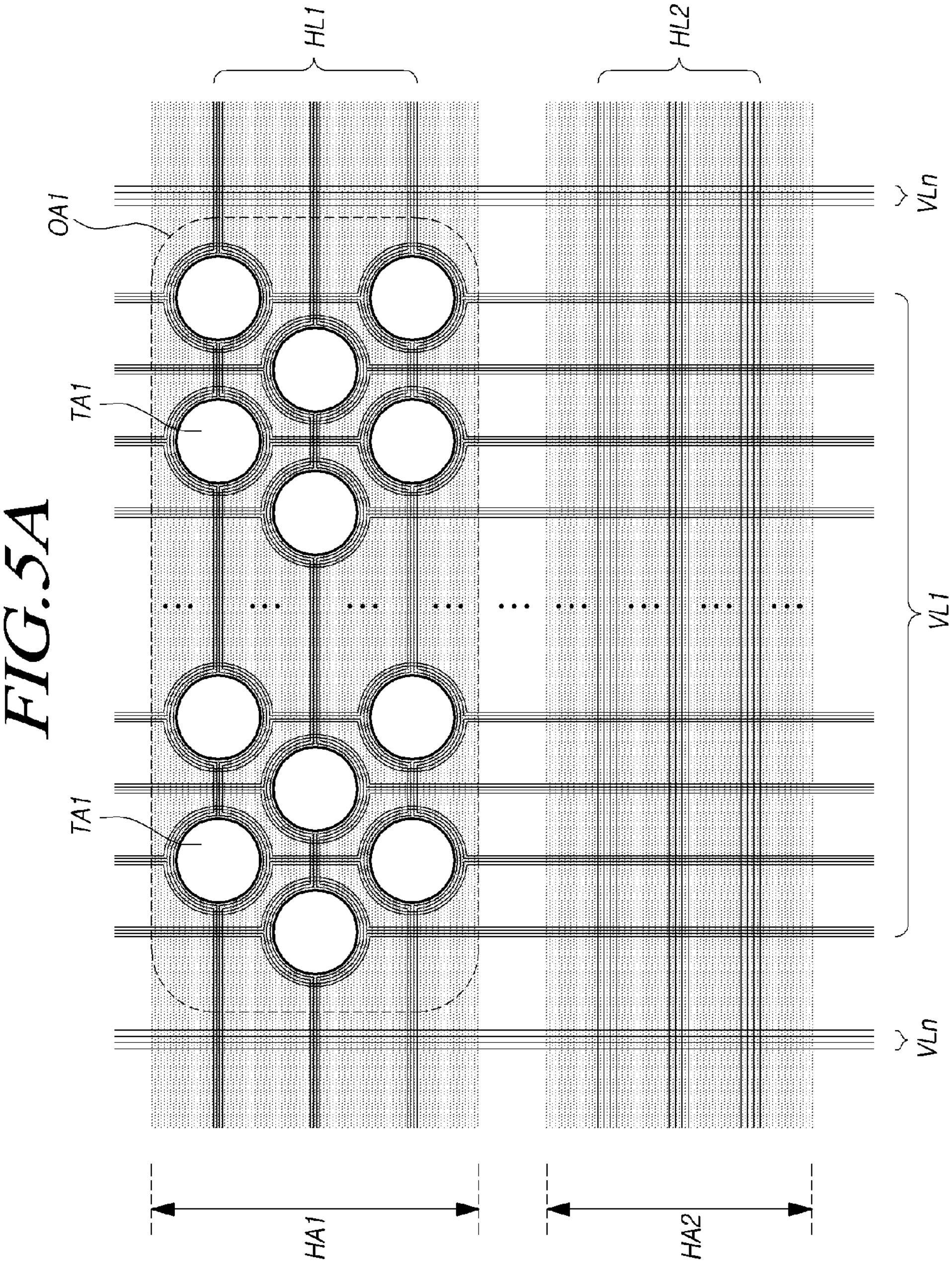
FIG. 5A illustrates arrangements of signal lines in each of a first optical area and a non-optical area in the display panel according to embodiments of the present disclosure.
Figure 5B:
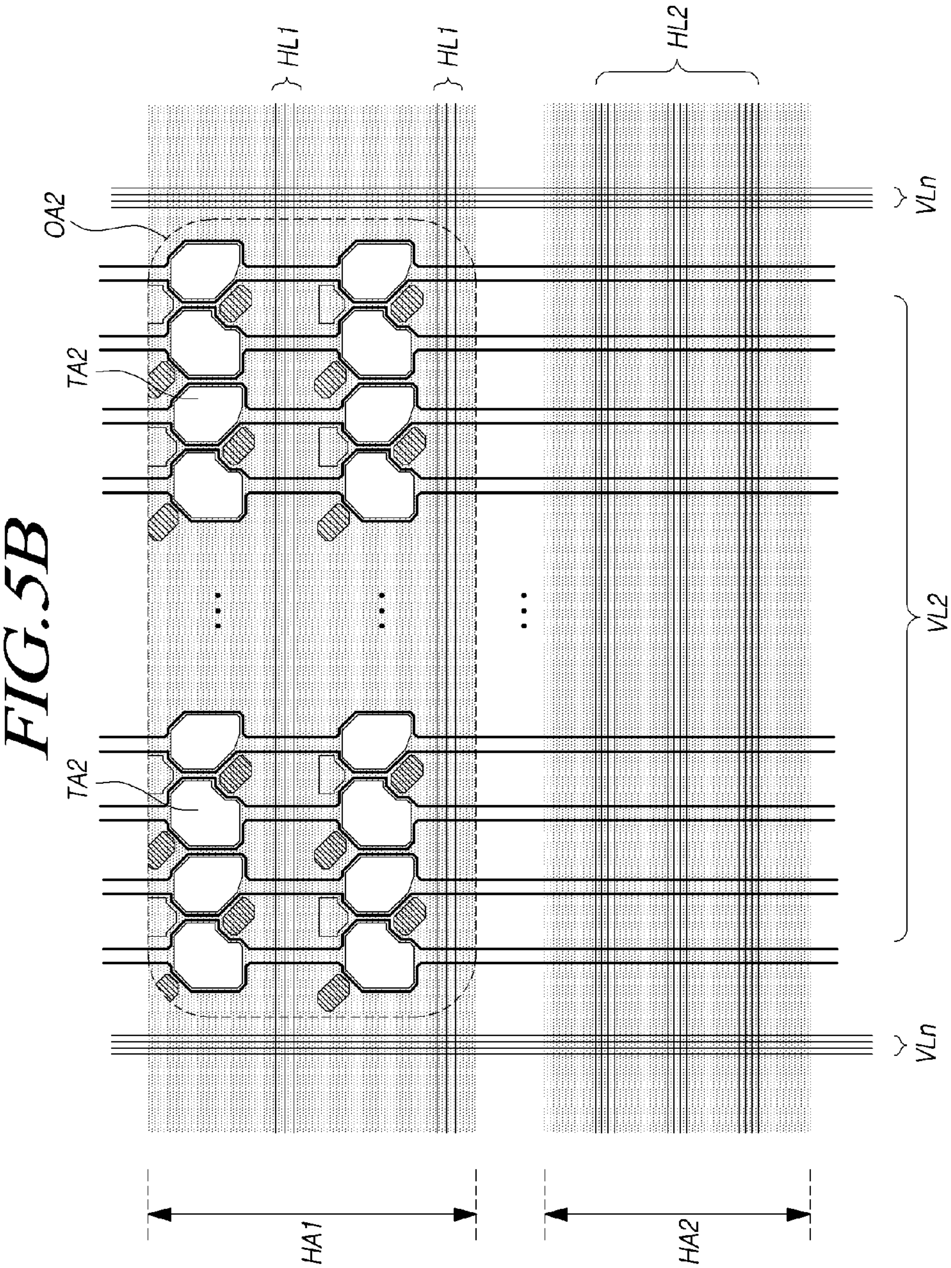
FIG. 5B illustrates arrangements of signal lines in each of a second optical area and the non-optical area in the display panel according to embodiments of the present disclosure.

FIG. 5A illustrates arrangements of signal lines in each of the first optical area OA1 and the non-optical area NA of the display panel 110 according to embodiments of the present disclosure, and FIG. 5B illustrates arrangements of signal lines in each of the second optical area OA2 and the non-optical area NA of the display panel 110 according to embodiments of the present disclosure.

First horizontal display areas HA1 shown in FIGS. 5A and 5B are portions of the first horizontal display area HA1 of the display panel 110, and second horizontal display areas HA2 therein are portions of the second horizontal display area HA2 of the display panel 110.

A first optical area OA1 shown in FIG. 5A is a portion of the first optical area OA1 of the display panel 110, and a second optical area OA2 shown in FIG. 5B is a portion of the second optical area OA2 of the display panel 110.

Referring to FIGS. 5A and 5B, the first horizontal display area HA1 may include a portion of the non-optical area NA, the first optical area OA1, and the second optical area OA2. The second horizontal display area HA2 may include another portion of the non-optical area NA that lacks the first optical area OA1 and the second optical area OA2.

Various types of horizontal lines HL1, HL2 and various types of vertical lines VLn, VL1, VL2 may be disposed in the display panel 11.

Herein, the term "horizontal" and the term "vertical" are used to refer to two directions intersecting the display panel. However, it should be noted that the horizontal direction and the vertical direction may be changed depending on a viewing direction. The horizontal direction may refer to, for example, a direction in which one gate line GL is disposed to extend and, and the vertical direction may refer to, for example, a direction in which one data line DL is disposed to extend. As such, the term horizontal and the term vertical are used to represent two directions.

Referring to FIGS. 5A and 5B, the horizontal lines disposed in the display panel 110 may include first horizontal lines HL1 disposed in the first horizontal display area HA1 and second horizontal lines HL2 disposed on the second horizontal display area HA2.

The horizontal lines disposed in the display panel 110 may be gate lines GL. That is, the first horizontal lines HL1 and the second horizontal lines HL2 may be the gate lines GL. The gate lines GL may include various types of gate lines according to structures of one or more subpixels SP.

Referring to FIGS. 5A and 5B, the vertical lines disposed in the display panel 110 may include typical vertical lines VLn disposed only in the non-optical area NA, first vertical lines VL1 running through both of the first optical area OA1 and the non-optical area NA, second vertical lines VL2 running through both of the second optical area OA2 and the non-optical area NA.

The vertical lines disposed in the display panel 110 may include data lines DL, driving voltage lines DVL, and the like, and may further include reference voltage lines, initialization voltage lines, and the like. That is, the typical vertical lines VLn, the first vertical lines VL1 and the second vertical lines VL2 may include the data lines DL, the driving voltage lines DVL, and the like, and may further include the reference voltage lines, the initialization voltage lines, and the like.

In some embodiments, it should be noted that the term "horizontal" in the second horizontal line HL2 may mean only that a signal is carried from a left side, to a right side, of the display panel (or from the right side to the left side), and may not mean that the second horizontal line HL2 runs in a straight line only in the direct horizontal direction. For example, in FIGS. 5A and 5B, although the second horizontal lines HL2 are illustrated in a straight line, however, one or more of the second horizontal lines HL2 may include one or more bent or folded portions differently from the configurations thereof. Likewise, one or more of the first horizontal lines HL1 may also include one or more bent or folded portions.

In some embodiments, it should be noted that the term "vertical" in the typical vertical line VLn may mean only that a signal is carried from an upper portion, to a lower portion, of the display panel (or from the lower portion to the upper portion), and may not mean that the typical vertical line VLn runs in a straight line only in the direct vertical direction. For example, in FIGS. 5A and 5B, although the typical vertical lines VLn are illustrated in a straight line, however, one or more of the typical vertical lines VLn may include one or more bent or folded portions differently from the configurations thereof. Likewise, one or more of the first vertical line VL1 and one or more of the second vertical line VL2 may also include one or more bent or folded portions.

Referring to FIG. 5A, the first optical area OA1 included in the first horizontal area HA1 may include light emitting areas EA and first transmission areas TA1. In the first optical area OA1, respective outer areas of the first transmission areas TA1 may include corresponding light emitting areas EA.

Referring to FIG. 5A, in order to improve the transmittance of the first optical area OA1, the first horizontal lines HL1 may run through the first optical area OA1 by avoiding the first transmission areas TA1 in the first optical area OA1.

Accordingly, each of the first horizontal lines HL1 running through the first optical area OA1 may include one or more curved or bent portions running around one or more respective outer edges of one or more of the first transmission areas TA1.

Accordingly, the first horizontal lines HL1 disposed in the first horizontal area HA1 and the second horizontal lines HL2 disposed in the second horizontal area HA2 may have different shapes or lengths. For example, the first horizontal lines HL1 running through the first optical area OA1 and the second horizontal lines HL2 not running through the first optical area OA1 may have different shapes or lengths.

Further, in order to improve the transmittance of the first optical area OA1, the first vertical lines VL1 may run through the first optical area OA1 by avoiding the first transmission areas TA1 in the first optical area OA1.

Accordingly, each of the first vertical lines VL1 running through the first optical area OA1 may include one or more curved or bent portions running around one or more respective outer edges of one or more of the first transmission areas TA1.

Thus, the first vertical lines VL1 running through the first optical area OA1 and the typical vertical lines VLn disposed in the non-optical area NA without running through the first optical area OA1 may have different shapes or lengths.

Referring to FIG. 5A, the first transmission areas TA1 included in the first optical area OA1 in the first horizontal area HA1 may be arranged in a diagonal direction.

Referring to FIG. 5A, in the first optical area OA1 in the first horizontal area HAL one or more light emitting areas EA may be disposed between two horizontally adjacent first transmission areas TA1. In the first optical area OA1 in the first horizontal area HAL one or more light emitting areas EA may be disposed between two vertically adjacent first transmission areas TA1.

Referring to FIG. 5A, the first horizontal lines HL1 disposed in the first horizontal area HAL that is, the first horizontal lines HL1 running through the first optical area OA1 each may include one or more curved or bent portions running around one or more respective outer edges of one or more of the first transmission areas TA1.

Referring to FIG. 5B, the second optical area OA2 included in the first horizontal area HA1 may include light emitting areas EA and second transmission areas TA2. In the second optical area OA2, respective outer areas of the second transmission areas TA2 may include corresponding light emitting areas EA.

In one embodiment, the light emitting areas EA and the second transmission areas TA2 in the second optical area OA2 may have locations and arrangements substantially equal to the light emitting areas EA and the first transmission areas TA1 in the first optical area OA1 of FIG. 5A.

In another embodiment, as shown in FIG. 5B, the light emitting areas EA and the second transmission areas TA2 in the second optical area OA2 may have locations and arrangements different from the light emitting areas EA and the first transmission areas TA1 in the first optical area OA1 of FIG. 5A.

For example, referring to FIG. 5B, the second transmission areas TA2 in the second optical area OA2 may be arranged in the horizontal direction (the left to right or right to left direction). A light emitting area EA may not be disposed between two second transmission areas TA2 adjacent to each other in the horizontal direction. Further, one or more of the light emitting areas EA in the second optical area OA2 may be disposed between second transmission areas TA2 adjacent to each other in the vertical direction (the top to bottom or bottom to top direction). For example, one or more light emitting areas EA may be disposed between two rows of second transmission areas.

When in the first horizontal area HA1, running through the second optical area OA2 and the non-optical area NA adjacent to the second optical area OA2, in one embodiment, the first horizontal lines HL1 may have substantially the same arrangement as the first horizontal lines HL1 of FIG. 5A.

In another embodiment, as shown in FIG. 5B, when in the first horizontal area HAL running through the second optical area OA2 and the non-optical area NA adjacent to the second optical area OA2, the first horizontal lines HL1 may have an arrangement different from the first horizontal lines HL1 of FIG. 5A.

This is because that the light emitting areas EA and the second transmission areas TA2 in the second optical area OA2 of FIG. 5B have locations and arrangements different from the light emitting areas EA and the first transmission areas TA1 in the first optical area OA1 of FIG. 5A.

Referring to FIG. 5B, when in the first horizontal area HAL the first horizontal lines HL1 run through the second optical area OA2 and the non-optical area NA adjacent to the second optical area OA2, the first horizontal lines HL1 may run between vertically adjacent second transmission areas TA2 in a straight line without having a curved or bent portion.

For example, one first horizontal line HL1 may have one or more curved or bent portions in the first optical area OA1, but may not have a curved or bent portion in the second optical area OA2.

In order to improve the transmittance of the second optical area OA2, the second vertical lines VL2 may run through the second optical area OA2 by avoiding the second transmission areas TA2 in the second optical area OA2.

Accordingly, each of the second vertical lines VL2 running through the second optical area OA2 may include one or more curved or bent portions running around one or more respective outer edges of one or more of the second transmission areas TA2.

Thus, the second vertical lines VL2 running through the second optical area OA2 and the typical vertical lines VLn disposed in the non-optical area NA without running through the second optical area OA2 may have different shapes or lengths.

As shown in FIG. 5A, each, or one or more, of the first horizontal lines HL1 running through the first optical area OA1 may have one or more curved or bent portions running around one or more respective outer edges of one or more of the first transmission areas TA1.

Accordingly, a length of the first horizontal line HL1 running through the first optical area OA1 and the second optical area OA2 may be slightly longer than a length of the second horizontal line HL2 disposed in the non-optical area NA without running through the first optical area OA1 and the second optical area OA2 and.

Accordingly, a resistance of the first horizontal line HL1 running through the first optical area OA1 and the second optical area OA2, which is referred to as a first resistance, may be slightly greater than a resistance of the second horizontal line HL2 disposed in the non-optical area NA without running through the first optical area OA1 and the second optical area OA2 and, which is referred to as a second resistance.

Referring to FIGS. 5A and 5B, according to a light transmitting structure, since the first optical area OA1 that at least partially overlaps the first optical electronic device 11 includes the first transmitting areas TA1, and the second optical area OA2 that at least partially overlaps with the second optical electronic device 12 includes the second transmission areas TA2, therefore, the first optical area OA1 and the second optical area OA2 may have the number of subpixels per unit area less than the non-optical area NA.

Accordingly, the number of subpixels connected to each, or one or more, of the first horizontal lines HL1 running through the first optical area OA1 and the second optical area OA2 may be different from the number of subpixels connected to each, or one or more, of the second horizontal lines HL2 disposed only in the non-optical area NA without running through the first optical area OA1 and the second optical area OA2.

The number of subpixels connected to each, or one or more, of the first horizontal lines HL1 running through the first optical area OA1 and the second optical area OA2, which is referred to as a first number, may be smaller than the number of subpixels connected to each, or one or more, of the second horizontal lines HL2 disposed only in the non-optical area NA without running through the first optical area OA1 and the second optical area OA2, which is referred to as a second number.

A difference between the first number and the second number may vary according to a difference between a resolution of each of the first optical area OA1 and the second optical area OA2 and a resolution of the non-optical area NA. For example, as a difference between a resolution of each of the first optical area OA1 and the second optical area OA2 and a resolution of the non-optical area NA increases, a difference between the first number and the second number may increase.

As described above, since the number (the first number) of subpixels connected to each, or one or more, of the first horizontal lines HL1 running through the first optical area OA1 and the second optical area OA2 is less than the number of subpixels (second number) connected to each, or one or more, of the second horizontal lines HL2 disposed only in the non-optical area NA without running through the first optical area OA1 and the second optical area OA2, an area where the first horizontal line HL1 overlaps one or more other electrodes or lines adjacent to the first horizontal line HL1 may be less than an area where the second horizontal line HL2 overlaps one or more other electrodes or lines adjacent to the second horizontal line HL2.

Accordingly, a parasitic capacitance formed between the first horizontal line HL1 and one or more other electrodes or lines adjacent to the first horizontal line HL1, which is referred to as a first capacitance, may be greatly smaller than a parasitic capacitance formed between the second horizontal line HL2 and one or more other electrodes or lines adjacent to the second horizontal line HL2, which is referred to as a second capacitance.

Considering a relationship in magnitude between the first resistance and the second resistance (the first resistance≥the second resistance) and a relationship in magnitude between the first capacitance and the second capacitance (the first capacitance<<second capacitance), a resistance-capacitance (RC) value of the first horizontal line HL1 running through the first optical area OA1 and the second optical area OA2, which is referred to as a first RC value, may be greatly smaller than an RC value of the second horizontal lines HL2 disposed in the non-optical area NA without running through the first optical area OA1 and the second optical area OA2, which is referred to as a second RC value, that is, resulting in the first RC value<<the second RC value.

Due to such a difference between the first RC value of the first horizontal line HL1 and the second RC value of the second horizontal line HL2, which is referred to as an RC load difference, a signal transmission characteristic through the first horizontal line HL1 may be different from a signal transmission characteristic through the second horizontal line HL2.

Figure 6:
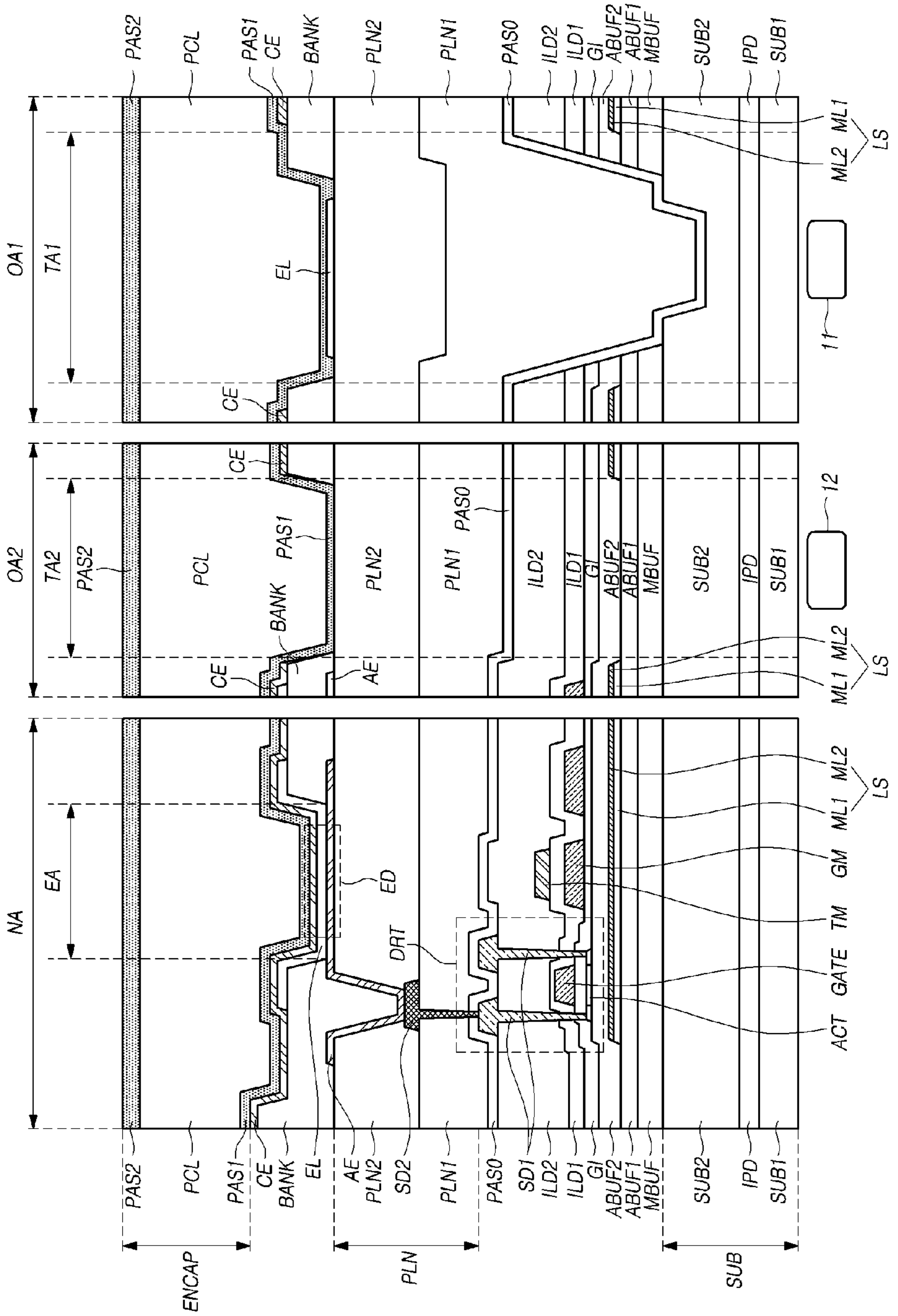
FIGS. 6 and 7 are cross-sectional views of each of the first optical area, the second optical area, and the non-optical area included in the display area of the display panel according to embodiments of the present disclosure.
Figure 7:
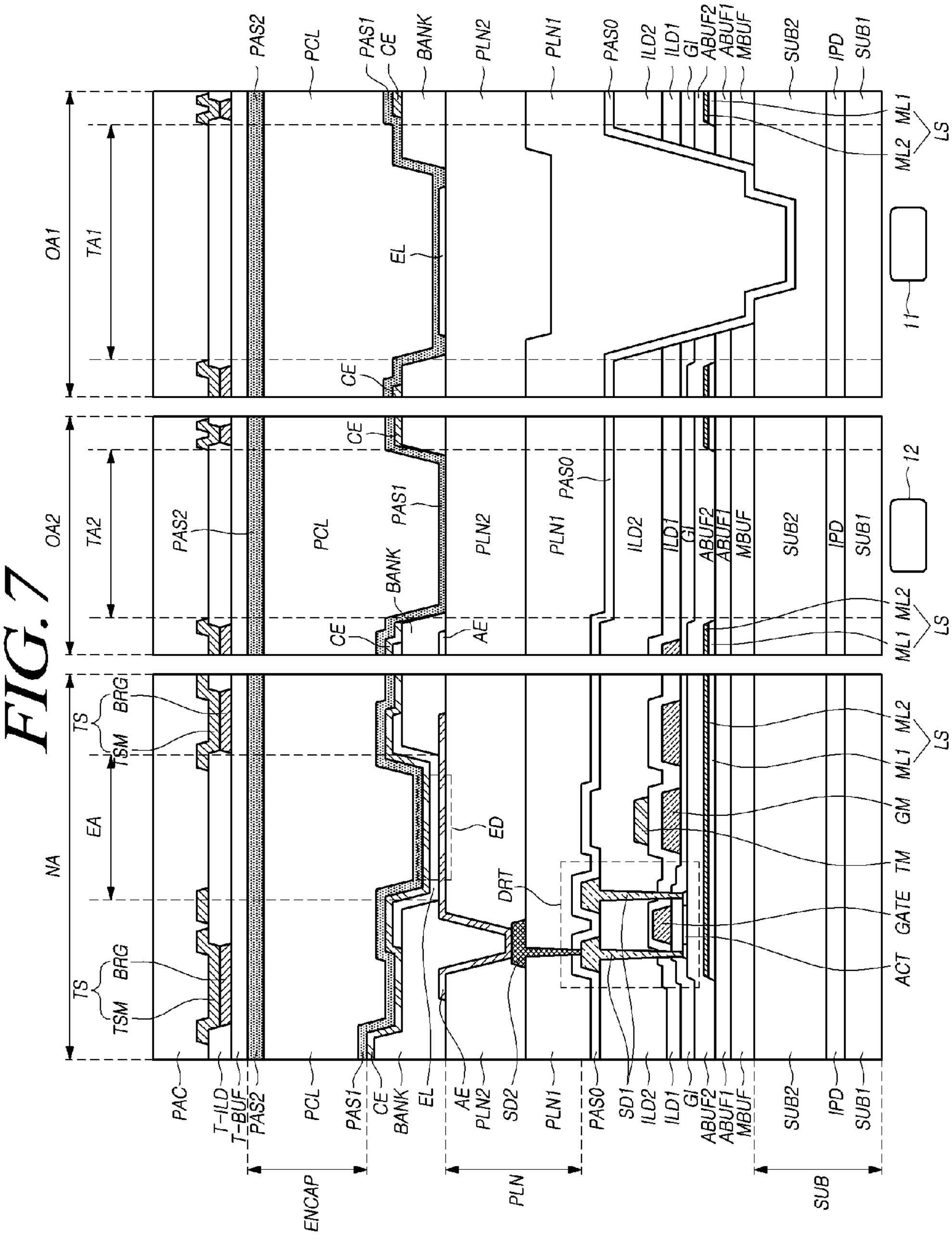

FIGS. 6 and 7 are cross-sectional views of each of the first optical area OA1, the second optical area OA2, and the non-optical area NA included in the display area DA of the display panel 110 according to embodiments of the present disclosure.

FIG. 6 shows the display panel 110 in a case where a touch sensor is implemented outside of the display panel 110 in the form of a touch panel, and FIG. 7 shows the display panel 110 in a case where a touch sensor TS is implemented inside of the display panel 110.

Each of FIGS. 6 and 7 shows cross-sectional views of the non-optical area NA, the first optical area OA1, and the second optical area OA2 included in the display area DA.

A stack structure of the non-optical area NA will be described with reference to FIGS. 6 and 7. Respective light emitting areas EA of the first optical area OA1 and the second optical area OA2 may have the same stack structure as the light emitting area EA of the non-optical area NA1.

Referring to FIGS. 6 and 7, a substrate SUB may include a first substrate SUB1, an interlayer insulating layer IPD, and a second substrate SUB2. The interlayer insulating layer IPD may be interposed between the first substrate SUB1 and the second substrate SUB2. As the substrate SUB includes the first substrate SUB1, the interlayer insulating layer IPD, and the second substrate SUB2, the substrate SUB can prevent or at least reduce the penetration of moisture. The first substrate SUB1 and the second substrate SUB2 may be, for example, polyimide (PI) substrates. The first substrate SUB1 may be referred to as a primary PI substrate, and the second substrate SUB2 may be referred to as a secondary PI substrate.

Referring to FIGS. 6 and 7, various types of patterns ACT, SD1, GATE, for disposing one or more transistors such as a driving transistor DRT, and the like, various types of insulating layers MBUF, ABUF1, ABUF2, GI, ILD1, ILD2, PAS0, and various types of metal patterns TM, GM, ML1, ML2 may be disposed on or over the substrate SUB.

Referring to FIGS. 6 and 7, a multi-buffer layer MBUF may be disposed on the second substrate SUB2, and a first active buffer layer ABUF1 may be disposed on the multi-buffer layer MBUF.

A first metal layer ML1 and a second metal layer ML2 may be disposed on the first active buffer layer ABUF1. The first metal layer ML1 and the second metal layer ML2 may be, for example, a light shield layer LS for shielding light.

A second active buffer layer ABUF2 may be disposed on the first metal layer ML1 and the second metal layer ML2. An active layer ACT of the driving transistor DRT may be disposed on the second active buffer layer ABUF2.

A gate insulating layer GI may be disposed to cover the active layer ACT.

A gate electrode GATE of the driving transistor DRT may be disposed on the gate insulating layer GI. In this situation, together with the gate electrode GATE of the driving transistor DRT, a gate material layer GM may be disposed on the gate insulating layer GI at a location different from a location where the driving transistor DRT is disposed.

The first interlayer insulating layer ILD1 may be disposed to cover the gate electrode GATE and the gate material layer GM. A metal pattern TM may be disposed on the first interlayer insulating layer ILD1. The metal pattern TM may be located at a location different from a location where the driving transistor DRT is formatted. A second interlayer insulating layer ILD2 may be disposed to cover the metal pattern TM on the first interlayer insulating layer ILD1.

Two first source-drain electrode patterns SD1 may be disposed on the second interlayer insulating layer ILD2. One of the two first source-drain electrode patterns SD1 may be a source node of the driving transistor DRT, and the other may be a drain node of the driving transistor DRT.

The two first source-drain electrode patterns SD1 may be electrically connected to first and second side portions of the active layer ACT, respectively, through contact holes formed in the second interlayer insulating layer ILD2, the first interlayer insulating layer ILD1, and the gate insulating layer GI.

A portion of the active layer ACT overlapping the gate electrode GATE may serve as a channel region. One of the two first source-drain electrode patterns SD1 may be connected to the first side portion of the channel region of the active layer ACT, and the other of the two first source-drain electrode patterns SD1 may be connected to the second side portion of the channel region of the active layer ACT.

A passivation layer PAS0 may be disposed to cover the two first source-drain electrode patterns SD1. A planarization layer PLN may be disposed on the passivation layer PAS0. The planarization layer PLN may include a first planarization layer PLN1 and a second planarization layer PLN2.

The first planarization layer PLN1 may be disposed on the passivation layer PAS0.

A second source-drain electrode pattern SD2 may be disposed on the first planarization layer PLN1. The second source-drain electrode pattern SD2 may be connected to one of the two first source-drain electrode patterns SD1 (corresponding to the second node N2 of the driving transistor DRT in the subpixel SP of FIG. 3) through a contact hole formed in the first planarization layer PLN1.

The second planarization layer PLN2 may be disposed to cover the second source-drain electrode pattern SD2. A light emitting element ED may be disposed on the second planarization layer PLN2.

According to an example stack structure of the light emitting element ED, an anode electrode AE may be disposed on the second planarization layer PLN2. The anode electrode AE may be electrically connected to the second source-drain electrode pattern SD2 through a contact hole formed in the second planarization layer PLN2.

A bank BANK may be disposed to cover a portion of the anode electrode AE. A portion of the bank BANK corresponding to a light emitting area EA of the subpixel SP may be opened.

A portion of the anode electrode AE may be exposed through the opening (the opened portion) of the bank BANK. An emission layer EL may be positioned on side surfaces of the bank BANK and in the opening (the opened portion) of the bank BANK. All or at least a portion of the emission layer EL may be located between adjacent banks.

In the opening of the bank BANK, the emission layer EL may contact the anode electrode AE. A cathode electrode CE may be disposed on the emission layer EL.

The light emitting element ED can be formed by including the anode electrode AE, the emission layer EL, and the cathode electrode CE, as described above. The emission layer EL may include an organic layer.

An encapsulation layer ENCAP may be disposed on the stack of the light emitting element ED.

The encapsulation layer ENCAP may have a single-layer structure or a multi-layer structure for example, as shown in FIGS. 6 and 7, the encapsulation layer ENCAP may include a first encapsulation layer PAS1, a second encapsulation layer PCL, and a third encapsulation layer PAS2.

The first encapsulation layer PAS1 and the third encapsulation layer PAS2 may be, for example, an inorganic layer, and the second encapsulation layer PCL may be, for example, an organic layer. Among the first encapsulation layer PAS1, the second encapsulation layer PCL, and the third encapsulation layer PAS2, the second encapsulation layer PCL may be the thickest and serve as a planarization layer.

The first encapsulation layer PAS1 may be disposed on the cathode electrode CE and may be disposed closest to the light emitting element ED. The first encapsulation layer PAS1 may include an inorganic insulating material capable of being deposited using low-temperature deposition. For example, the first encapsulation layer PAS1 may include, but not limited to, silicon nitride (SiNx), silicon oxide (SiOx), silicon oxynitride (SiON), aluminum oxide (Al2O3), or the like. Since the first encapsulation layer PAS1 can be deposited in a low temperature atmosphere, during the deposition process, the first encapsulation layer PAS1 can prevent the emission layer EL including an organic material vulnerable to a high temperature atmosphere from being damaged.

The second encapsulation layer PCL may have a smaller area than the first encapsulation layer PAS1. For example, the second encapsulation layer PCL may be disposed to expose both ends or edges of the first encapsulation layer PAS1. The second encapsulation layer PCL can serve as a buffer for relieving stress between corresponding layers while the display device 100 is curved or bent, and also serve to enhance planarization performance. For example, the second encapsulation layer PCL may include an organic insulating material, such as acrylic resin, epoxy resin, polyimide, polyethylene, silicon oxycarbon (SiOC), or the like. The second encapsulation layer PCL may be disposed, for example, using an inkjet scheme.

The third inorganic encapsulation layer PAS2 may be disposed over the substrate SUB over which the second encapsulation layer PCL is disposed to cover the respective top surfaces and side surfaces of the second encapsulation layer PCL and the first encapsulation layer PAS1. The third encapsulation layer PAS2 can minimize or prevent or at least reduce external moisture or oxygen from penetrating into the first inorganic encapsulation layer PAS1 and the organic encapsulation layer PCL. For example, the third encapsulation layer PAS2 may include an inorganic insulating material, such as silicon nitride (SiNx), silicon oxide (SiOx), silicon oxynitride (SiON), aluminum oxide (Al2O3), or the like.

Referring to FIG. 7, in a case where a touch sensor TS is embedded into the display panel 110, the touch sensor TS may be disposed on the encapsulation layer ENCAP. The structure of the touch sensor will be described in detail as follows.

A touch buffer layer T-BUF may be disposed on the encapsulation layer ENCAP.

The touch sensor TS may be disposed on the touch buffer layer T-BUF.

The touch sensor TS may include touch sensor metals TSM and at least one bridge metal BRG, which are located in different layers.

A touch interlayer insulating layer T-ILD may be disposed between the touch sensor metals TSM and the bridge metal BRG.

For example, the touch sensor metals TSM may include a first touch sensor metal TSM, a second touch sensor metal TSM, and a third touch sensor metal TSM, which are disposed adjacent to one another. In an embodiment where the third touch sensor metal TSM is disposed between the first touch sensor metal TSM and the second touch sensor metal TSM, and the first touch sensor metal TSM and the second touch sensor metal TSM need to be electrically connected to each other, the first touch sensor metal TSM and the second touch sensor metal TSM may be electrically connected to each other through the bridge metal BRG located in a different layer. The bridge metal BRG may be electrically insulated from the third touch sensor metal TSM by the touch interlayer insulating layer T-ILD.

While the touch sensor TS is disposed on the display panel 110, a chemical solution (developer or etchant, etc.) used in the corresponding process or moisture from the outside may be generated or introduced. By disposing the touch sensor TS on the touch buffer layer T-BUF, a chemical solution or moisture can be prevented from penetrating into the emission layer EL including an organic material during the manufacturing process of the touch sensor TS. Accordingly, the touch buffer layer T-BUF can prevent or at least reduce damage to the emission layer EL, which is vulnerable to a chemical solution or moisture.

In order to prevent or at least reduce damage to the emission layer EL including an organic material, which is vulnerable to high temperatures, the touch buffer layer T-BUF can be formed at a low temperature less than or equal to a predetermined temperature (e.g., 100 degrees (° C.)) and be formed using an organic insulating material having a low permittivity of 1 to 3. For example, the touch buffer layer T-BUF may include an acrylic-based, epoxy-based, or silicon-based material. As the display device 100 is bent, the encapsulation layer ENCAP may be damaged, and the touch sensor metal located on the touch buffer layer T-BUF may be cracked or broken. Even when the display device 100 is bent, the touch buffer layer T-BUF having the planarization performance as the organic insulating material can prevent the damage of the encapsulation layer ENCAP and/or the cracking or breaking of the metals (TSM, BRG) included in the touch sensor TS.

A protective layer PAC may be disposed to cover the touch sensor TS. The protective layer PAC may be, for example, an organic insulating layer.

Next, a stack structure of the first optical area OA1 will be described with reference to FIGS. 6 and 7.

Referring to FIGS. 6 and 7, the light emitting area EA of the first optical area OA1 may have the same stack structure as that in the non-optical area NA. Accordingly, in the discussion that follows, instead of repeatedly describing the light emitting area EA in the first optical area OA1, a stack structure of the first transmission area TA1 in the first optical area OA1 will be described in detail below.

The cathode electrode CE may be disposed in the light emitting areas EA included in the non-optical area NA and the first optical area OA1, but may not be disposed in the first transmission area TA1 in the first optical area OA1. For example, the first transmission area TA1 in the first optical area OA1 may correspond to an opening of the cathode electrode CE.

Further, the light shield layer LS including at least one of the first metal layer ML1 and the second metal layer ML2 may be disposed in the light emitting areas EA included in the non-optical area NA and the first optical area OA1, but may not be disposed in the first transmission area TA1 in the first optical area OA1. For example, the first transmission area TA1 in the first optical area OA1 may correspond to an opening of the light shield layer LS.

The substrate SUB1, SUB2, and the various types of insulating layers (MBUF, ABUF1, ABUF2, GI, ILD1, ILD2, PAS0, PLN (PLN1, PLN2), BANK, ENCAP (PAS1, PCL, PAS2), T-BUF, T-ILD, PAC) disposed in the light emitting areas EA included in the non-optical area NA and the first optical area OA1 may be disposed in the first transmission area TA1 in the first optical area OA1 equally, substantially equally, or similarly.

However, all, or one or more, of one or more material layers having electrical properties (e.g., a metal material layer, a semiconductor layer, etc.), except for the insulating materials or layers, disposed in the light emitting areas EA included in the non-optical area NA and the first optical area OA1 may not be disposed in the first transmission area TA1 in the first optical area OA1.

For example, referring to FIGS. 6 and 7, all, or one or more, of the metal material layers (ML1, ML2, GATE, GM, TM, SD1, SD2) related to at least one transistor and the semiconductor layer ACT may not be disposed in the first transmission area TA1.

Further, referring to FIGS. 6 and 7, the anode electrode AE and the cathode electrode CE included in the light emitting element ED may not be disposed in the first transmission area TA1. In some embodiments, the emission layer EL of the light emitting element ED may or may not be disposed in the first transmission area TA1 according to a design requirement.

Further, referring to FIG. 7, the touch sensor metal TSM and the bridge metal BRG included in the touch sensor TS may not be disposed in the first transmission area TA1 in the first optical area OA1.

Accordingly, the light transmittance of the first transmission area TA1 in the first optical area OA1 can be provided or improved because the material layers (e.g., the metal material layer, the semiconductor layer, etc.) having electrical properties are not disposed in the first transmission area TA1 in the first optical area OA1. As a consequence, the first optical electronic device 11 can perform a predefined function (e.g., image sensing) by receiving light transmitting through the first transmission area TA1.

Since all, or one or more, of the first transmission area TA1 in the first optical area OA1 overlap the first optical electronic device 11, for enabling the first optical electronic device 11 to normally operate, it is necessary to further increase a transmittance of the first transmission area TA1 in the first optical area OA1.

To do this, in some embodiments, the first transmission area TA1 formed in the first optical area OA1 of the display panel 110 of the display device 100 may have a transmittance improvement structure TIS.

Referring to FIGS. 6 and 7, the plurality of insulating layers included in the display panel 110 may include the buffer layers (MBUF, ABUF1, ABUF2) between at least one substrate (SUB1, SUB2) and at least one transistor (DRT, SCT), the planarization layers (PLN1, PLN2) between the transistor DRT and the light emitting element ED, the encapsulation layer ENCAP on the light emitting element ED, and the like.

Referring to FIG. 7, the plurality of insulating layers included in the display panel 110 may further include the touch buffer layer T-BUF and the touch interlayer insulating layer T-ILD located on the encapsulation layer ENCAP, and the like.

Referring to FIGS. 6 and 7, the first transmission area TA1 in the first optical area OA1 can have a structure (e.g., a recess, trench, concave, protrusion, etc.) in which the first planarization layer PLN1 and the passivation layer PAS0 have depressed portions that extend downward from respective surfaces thereof toward the substrate SUB as a transmittance improvement structure TIS.

Referring to FIGS. 6 and 7, among the plurality of insulating layers, the first planarization layer PLN1 may include at least one depression (or recess, trench, concave, protrusion, etc.). The first planarization layer PLN1 may be, for example, an organic insulating layer.

In a case where the first planarization layer PLN1 has the depressed portion that extends downward from the surfaces thereof, the second planarization layer PLN2 can substantially serve to planarize. In one embodiment, the second planarization layer PLN2 may also have a depressed portion that extends downward from the surface thereof. In this case, the second encapsulation layer PCL can substantially serve to planarize.

Referring to FIGS. 6 and 7, the depressed portions of the first planarization layer PLN1 and the passivation layer PAS0 may pass through insulating layers, such as the first interlayer insulating layer ILD, the second interlayer insulating layer ILD2, the gate insulating layer GI, and the like, for forming the transistor DRT, and buffer layers, such as the first active buffer layer ABUF1, the second active buffer layer ABUF2, the multi-buffer layer MBUF, and the like, located under the insulating layers, and extend up to an upper portion of the second substrate SUB2.

Referring to FIGS. 6 and 7, the substrate SUB may include at least one concave portion or depressed portion as a transmittance improvement structure TIS. For example, in the first transmission area TA1, an upper portion of the second substrate SUB2 may be indented or depressed downward, or the second substrate SUB2 may be perforated.

Referring to FIGS. 6 and 7, the first encapsulation layer PAS1 and the second encapsulation layer PCL included in the encapsulation layer ENCAP may also have a transmittance improvement structure TIS in which the first encapsulation layer PAS1 and the second encapsulation layer PCL have depressed portions that extend downward from the respective surfaces thereof toward the substrate SUB. The second encapsulation layer PCL may be, for example, an organic insulating layer.

Referring to FIG. 7, to protect the touch sensor TS, the protective layer PAC may be disposed to cover the touch sensor TS on the encapsulation layer ENCAP.

Referring to FIG. 7, the protective layer PAC may have at least one depression (or recess, trench, concave, protrusion, etc.) as a transmittance improvement structure TIS in a portion overlapping the first transmission area TA1. The protective layer PAC may be, for example, an organic insulating layer.

Referring to FIG. 7, the touch sensor TS may include one or more touch sensor metals TSM with a mesh type. In a case where the touch sensor metal TSM is formed in the mesh type, a plurality of openings may be formed in the touch sensor metal TSM. Each of the plurality of openings may be located to correspond to the light emitting area EA of the subpixel SP.

In order for the first optical area OA1 to have a transmittance higher than the non-optical area NA, an area or size of the touch sensor metal TSM per unit area in the first optical area OA1 may be less than an area or size of the touch sensor metal TSM per unit area in the non-optical area NA.

Referring to FIG. 7, the touch sensor TS may be disposed in the light emitting area EA in the first optical area OA1, but may not be disposed in the first transmission area TA1 in the first optical area OA1.

Next, a stack structure of the second optical area OA2 will be described with reference to FIGS. 6 and 7.

Referring to FIGS. 6 and 7, the light emitting area EA of the second optical area OA2 may have the same stack structure as that of the non-optical NA. Accordingly, in the discussion that follows, instead of repeatedly describing the light emitting area EA in the second optical area OA2, a stack structure of the second transmission area TA2 in the second optical area OA21 will be described in detail below.

The cathode electrode CE may be disposed in the light emitting areas EA included in the non-optical area NA and the second optical area OA2, but may not be disposed in the second transmission area TA2 in the second optical area OA2. For example, the second transmission area TA2 in the second optical area OA2 may be corresponded to an opening of the cathode electrode CE.

Further, the light shield layer LS including at least one of the first metal layer ML1 and the second metal layer ML2 may be disposed in the light emitting areas EA included in the non-optical area NA and the second optical area OA2, but may not be disposed in the second transmission area TA2 in the second optical area OA2. For example, the second transmission area TA2 in the second optical area OA2 may be corresponded to an opening of the light shield layer LS.

When the transmittance of the second optical area OA2 and the transmittance of the first optical area OA1 are the same, the stack structure of the second transmission area TA2 in the second optical area OA2 may be the same as the stacked structure of the first transmission area TA1 in the first optical area OA1.

When the transmittance of the second optical area OA2 and the transmittance of the first optical area OA1 are different, the stack structure of the second transmission area TA2 in the second optical area OA2 may be different in at least a portion of the stacked structure of the first transmission area TA1 in the first optical area OA1.

For example, as shown in FIGS. 6 and 7, when the transmittance of the second optical area OA2 less than the transmittance of the first optical area OA1, the second transmission area TA2 in the second optical area OA2 may not have a transmittance improvement structure TIS. As a result, the first planarization layer PLN1 and the passivation layer PAS0 may not be indented or depressed. Further, a width of the second transmission area TA2 in the second optical area OA2 may be less than a width of the first transmission area TA1 in the first optical area OA1.

The substrate (SUB1, SUB2), and the various types of insulating layers (MBUF, ABUF1, ABUF2, GI, ILD1, ILD2, PAS0, PLN (PLN1, PLN2), BANK, ENCAP (PAS1, PCL, PAS2), T-BUF, T-ILD, PAC) disposed in the light emitting areas EA included in the non-optical area NA and the second optical area OA2 may be disposed in the second transmission area TA2 in the second optical area OA2 equally, substantially equally, or similarly.

However, all, or one or more, of one or more material layers having electrical properties (e.g., a metal material layer, a semiconductor layer, etc.), except for the insulating materials or layers, disposed in the light emitting areas EA included in the non-optical area NA and the second optical area OA2 may not be disposed in the second transmission area TA2 in the second optical area OA2.

For example, referring to FIGS. 6 and 7, all, or one or more, of the metal material layers (ML1, ML2, GATE, GM, TM, SD1, SD2) related to at least one transistor and the semiconductor layer ACT may not be disposed in the second transmission area TA2 in the second optical area OA2.

Further, referring to FIGS. 6 and 7, the anode electrode AE and the cathode electrode CE included in the light emitting element ED may not be disposed in the second transmission area TA2. In some embodiments, the emission layer EL of the light emitting element ED may or may not be disposed on the second transmission area TA2 according to a design requirement.

Further, referring to FIG. 7, the touch sensor metal TSM and the bridge metal BRG included in the touch sensor TS may not be disposed in the second transmission area TA2 in the second optical area OA2.

Accordingly, the light transmittance of the second transmission area TA2 in the second optical area OA2 can be provided or improved because the material layers (e.g., the metal material layer, the semiconductor layer, etc.) having electrical properties are not disposed in the second transmission area TA2 in the second optical area OA2. As a consequence, the second optical electronic device 12 can perform a predefined function (e.g., approach detection of an object or human body, external illumination detection, etc.) by receiving light transmitting through the second transmission area TA2.

Figure 8:
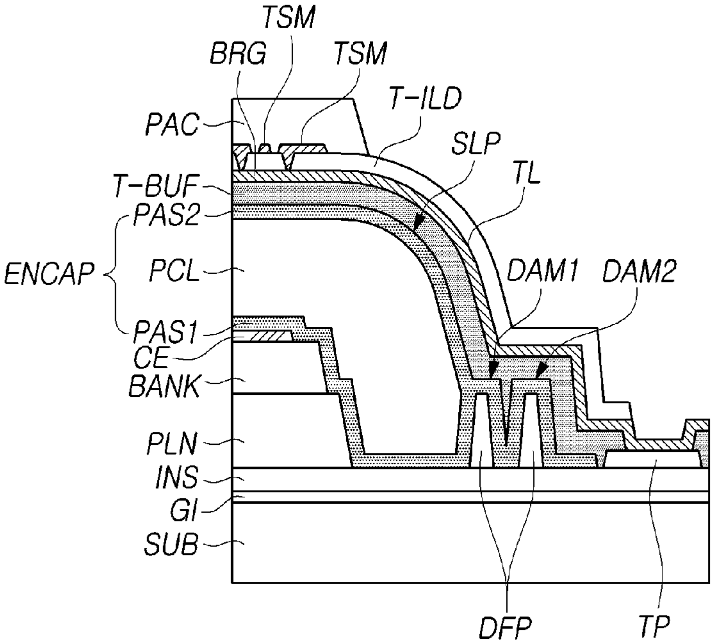
FIG. 8 is a cross-sectional view of an edge of the display panel according to embodiments of the present disclosure.

FIG. 8 is a cross-sectional view of an edge of the display panel 110 according to embodiments of the present disclosure.

For simplicity of illustration, FIG. 8 illustrates a single substrate SUB including the first substrate SUB1 and the second substrate SUB2, and layers or portions located under the bank BANK are shown in a simplified structure as well. Likewise, FIG. 8 illustrates a single planarization layer PLN including the first planarization layer PLN1 and the second planarization layer PLN2, and a single interlayer insulating layer INS including the second interlayer insulating layer ILD2 and the first interlayer insulating layer ILD1 located under the planarization layer PLN.

Referring to FIG. 8, the first encapsulation layer PAS1 may be disposed on the cathode electrode CE and disposed closest to the light emitting element ED. The second encapsulation layer PCL may have a smaller area or size than the first encapsulation layer PAS1. For example, the second encapsulation layer PCL may be disposed to expose both ends or edges of the first encapsulation layer PAS1.

The third inorganic encapsulation layer PAS2 may be disposed over the substrate SUB over which the second encapsulation layer PCL is disposed such that the third inorganic encapsulation layer PAS2 covers the respective top surfaces and side surfaces of the second encapsulation layer PCL and the first encapsulation layer PAS1.

The third encapsulation layer PAS2 can reduce or prevent external moisture or oxygen from penetrating into the first inorganic encapsulation layer PAS1 and the organic encapsulation layer PCL.

Referring to FIG. 8, in order to prevent or at least reduce the encapsulation layer ENCAP from collapsing, the display panel 110 may include one or more dams (DAM1, DAM2)

at, or near to, an end or edge of an inclined surface SLP of the encapsulation layer ENCAP. The one or more dams (DAM1, DAM2) may be present at, or near to, a boundary point between the display area DA and the non-display area NDA.

The one or more dams (DAM1, DAM2) may include the same material DFP as the bank BANK.

Referring to FIG. 8, in one embodiment, the second encapsulation layer PCL including an organic material may be located only on an inner side of a first dam DAM1, which is located closest to the inclined surface SLP of the encapsulation layer ENCAP among the dams. For example, the second encapsulation layer PCL may not be located on all of the dams (DAM1, DAM2). In another embodiment, the second encapsulation layer PCL including an organic material may be located on at least the first dam DAM1 of the first dam DAM1 and a second dam DAM2.

For example, the second encapsulation layer PCL may extend only up to all, or at least a portion, of an upper portion of the first dam DAM1. In further another embodiment, the second encapsulation layer PCL may extend past the upper portion of the first dam DAM1 and extend up to all, or at least a portion of, an upper portion of the secondary dam DAM2.

Referring to FIG. 8, a touch pad TP, to which the touch driving circuit 260 is electrically connected, may be disposed on a portion of the substrate SUB outside of the one or more dams (DAM1, DAM2).

A touch line TL can electrically connect, to the touch pad TP, the touch sensor metal TSM or the bridge metal BRG included in, or serving as, a touch electrode disposed in the display area DA.

One end or edge of the touch line TL may be electrically connected to the touch sensor metal TSM or the bridge metal BRG, and the other end or edge of the touch line TL may be electrically connected to the touch pad TP.

The touch line TL may run downward along the inclined surface SLP of the encapsulation layer ENCAP, run along the respective upper portions of the dams DAM1, DAM2, and extend up to the touch pad TP disposed outside of the dams (DAM1, DAM2).

Referring to FIG. 8, in one embodiment, the touch line TL may be the bridge metal BRG. In another embodiment, the touch line TL may be the touch sensor metal TSM.

Figure 9:
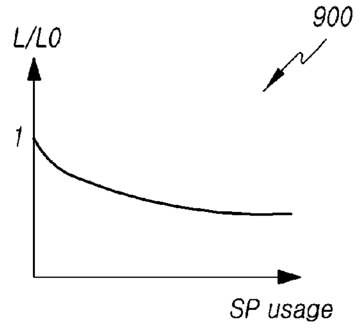
FIG. 9 is a graph representing a degree of degradation according to the usage of one or more subpixels in the display panel according to embodiments of the present disclosure.

FIG. 9 is a graph 900 representing a degree of degradation according to usage of one or more subpixels in the display panel 110 according to embodiments of the present disclosure. Herein, the usage of one or more subpixels may mean a time over which the one or more subpixels have been used or a degree to which the one or more subpixels have been used.

Further, herein, although a plurality of subpixels can be disposed in each of the one or more optical areas or the non-optical area of the display area of the display panel, for convenience of description, sometimes, embodiments or examples may be described based on a single subpixel. Thus, it should be noted that although embodiments or examples are described based on a single subpixel, a plurality of subpixels are equally applied to such embodiments or examples.

Circuit elements included in each of the plurality of subpixels SP arranged in the display panel 110 may be subject to degradation such as operating variations over time and usage, this leading the values of unique characteristics of the circuit elements to vary.

For example, each subpixel SP may include a light emitting element ED, and a driving transistor DRT, and the like as such circuit elements. For example, the characteristic values of the circuit elements may include a threshold voltage of the light emitting element ED, a threshold voltage and mobility of the driving transistor DRT, and the like.

In case the characteristic values of the circuit elements vary as the driven time of the circuit elements included in each of the plurality of subpixels SP increases, a luminance value L of each of the plurality of subpixels SP may vary, and thereby, a difference in luminance between the plurality of subpixels the SPs may occur. Such a luminance difference may cause a luminance non-uniformity of the display panel 110, and as a result, deteriorate image quality.

An increase in driven time of circuit elements included in the subpixel SP may mean that the amount of used time of the subpixel SP, (e.g., the usage of the subpixel SP), increases. For example, if the usage of a subpixel SP increases, the luminance value L of the subpixel SP may decrease.

As the usage of the subpixel SP increases, respective degradation levels of circuit elements in the subpixel SP may increase. If the degradation levels of the circuit elements in the subpixel SP increase, the luminance value L of the subpixel SP may decrease.

Referring to FIG. 9, in some embodiment, the display device 100 can store a respective initial luminance value L0 for each of the plurality of subpixels SP in advance, or store one initial luminance value L0 for all or some of the plurality of subpixels SP in advance.

For example, the initial luminance value L0 may be generated before the display device 100 is rolled out and stored in a memory (not shown) of the display device 100.

In another example, when the display device 100 is initially set after the display device 100 is rolled out, the initial luminance value L0 may be generated by the display device 100 and stored in a memory (not shown) of the display device 100. In the initial setting, the display device 100 can measure luminance values of the optical areas (OA1, OA2) using the optical electronic devices (11, 12), generate and store the measured luminance values as the initial luminance values L0 in the memory.

As the usage of the subpixel SP increases, degradation levels of circuit elements in the subpixel SP may increase, and thereby, a luminance value L of the subpixel SP may be less than the initial luminance value L0. Accordingly, a value L/L0 obtained by dividing the luminance value L of the subpixel SP by the initial luminance value L0 of the subpixel SP may be less than 1.

Here, the value L/L0 obtained by dividing the luminance value L of the subpixel SP by the initial luminance value L0 of the subpixel SP may be a luminance index of the subpixel SP. The luminance index L/L0 of the subpixel SP may represent the luminance value L of the subpixel SP with respect to the initial luminance value L0 of the subpixel SP. The luminance index L/L0 of the subpixel SP may be a value (a rational number) of 1 or less.

The luminance index L/L0 of the subpixel SP may descend (decrease) as the driving time for the subpixel SP increases. The luminance index L/L0 of the subpixel SP may descend as the amount of the used time of the subpixel SP increases. The luminance index L/L0 of the subpixel SP may descend as respective degradation of the circuit elements (e.g., the light emitting element ED, the driving transistor DRT, and the like) in the subpixel SP is developed, that is, as respective degradation levels increase.

Hereinafter, for convenience of description, "degradation of circuit elements in the subpixel SP" may be referred to as "degradation of the subpixel SP" or simply as "degradation".

Embodiments of the present disclosure provide a real-time degradation compensation method and system for performing degradation monitoring in real time using the optical electronic devices (11, 12), optimizing degradation modeling based on the result of the monitoring, and compensating for the degradation in real time using the optimized degradation modeling.

Hereinafter, the real-time degradation compensation method and system according to embodiments of the present disclosure will be described in detail with references to accompanying figures.

Figure 10:
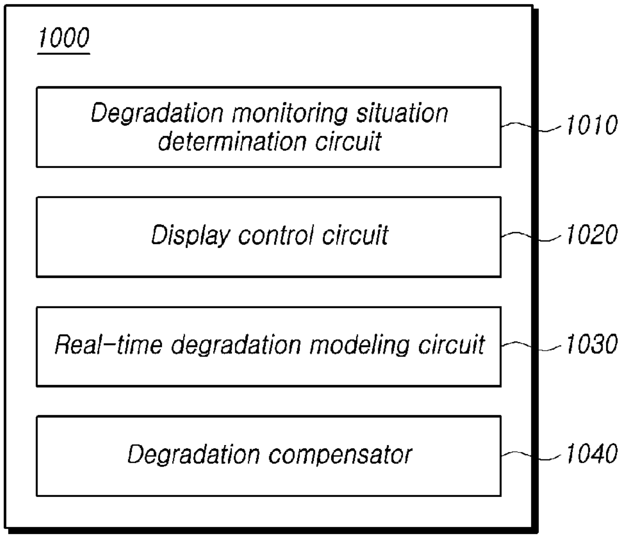
FIG. 10 is a block diagram of a real-time degradation compensation system in the display device according to embodiments of the present disclosure.
Figure 11:
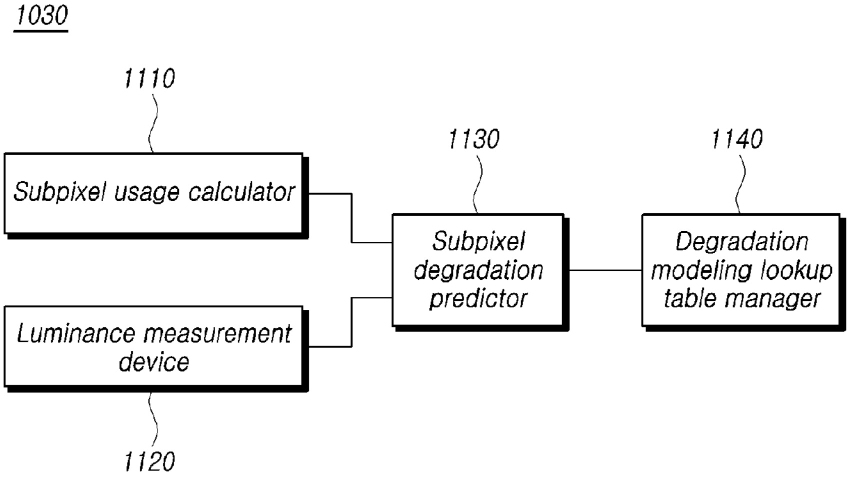
FIG. 11 is a block diagram of a real-time degradation modeling circuit in the real-time degradation compensation system in the display device according to embodiments of the present disclosure.
Figure 12:
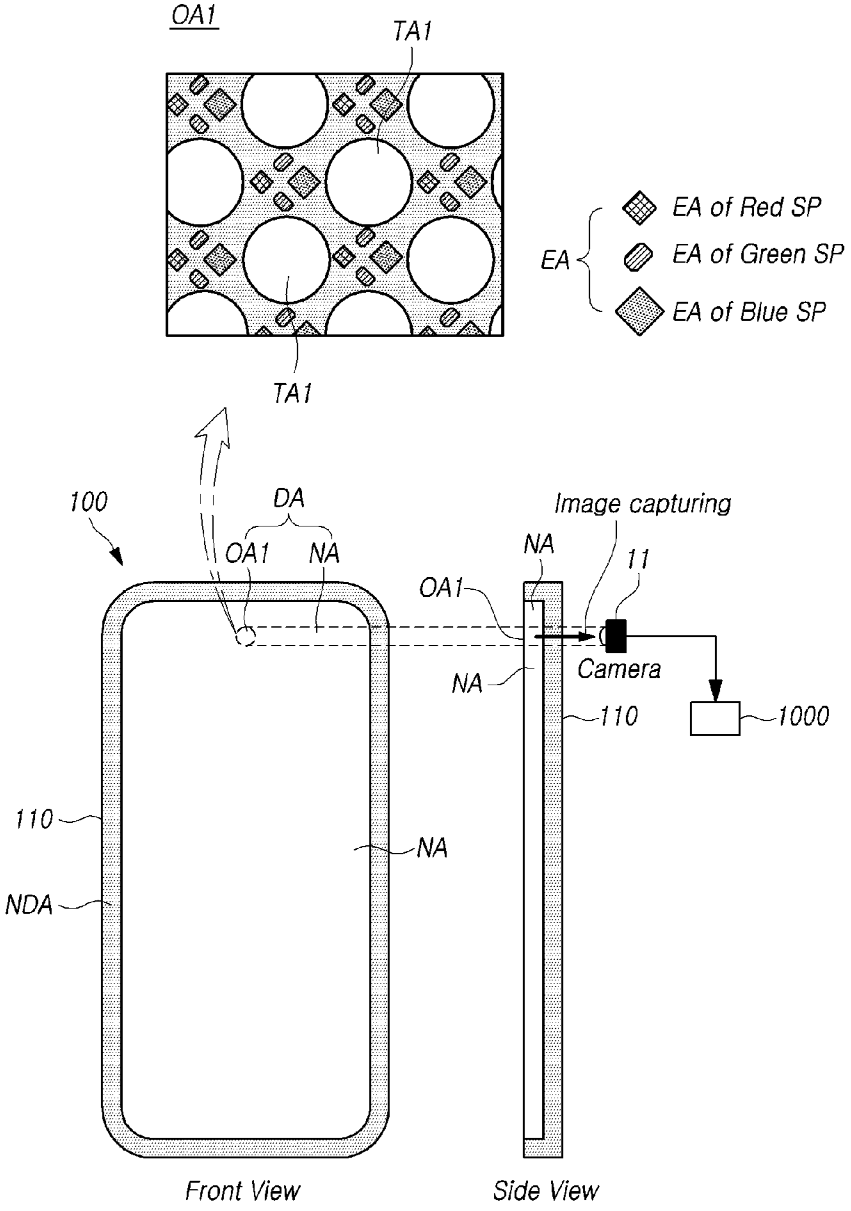
FIGS. 12 and 13 illustrate degradation monitoring structures using one or more optical electronic devices in the display device according to embodiments of the present disclosure.
Figure 13:
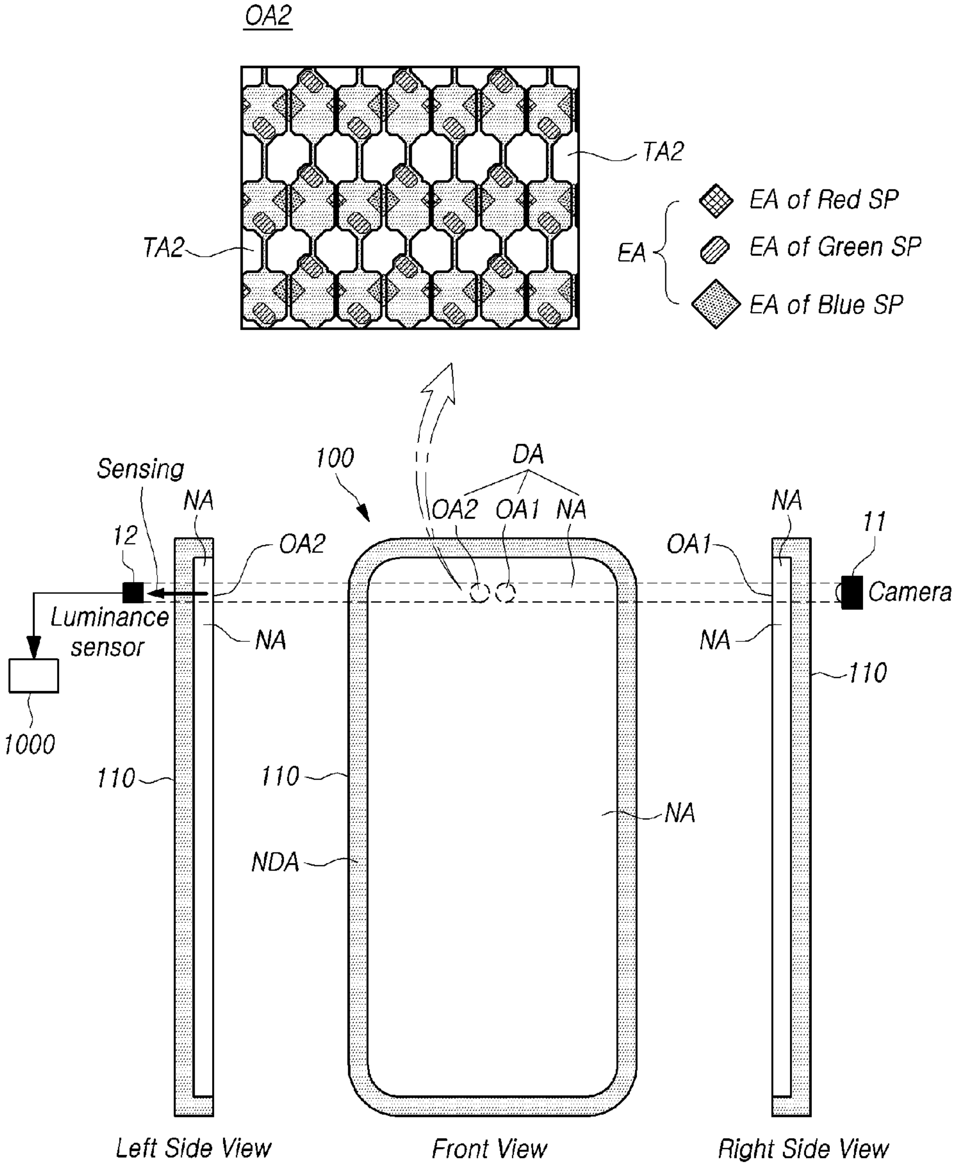

FIG. 10 is a block diagram of the real-time degradation compensation system 1000 of the display device 100 according to embodiments of the present disclosure. FIG. 11 is a block diagram of a real-time degradation modeling circuit 1030 in the real-time degradation compensation system 1000 in the display device 100 according to embodiments of the present disclosure. FIGS. 12 and 13 illustrate degradation monitoring structures using one or more optical electronic devices (11, 12) in the display device 100 according to embodiments of the present disclosure.

Referring to FIG. 10, in some embodiments, the display device 100 may further include the real-time degradation compensation system 1000.

When it is determined that degradation monitoring is available or needed according to a predefined condition, the real-time degradation compensation system 1000 can control the one or more optical electronic devices (11, 12) to execute an image capturing operation or a sensing operation, and measure luminance of the one or more optical electronic devices (11, 12) based on a result of the execution of the image capturing operation or the sensing operation of the one or more optical electronic devices (11, 12). Herein, the process of measuring the luminance (luminance measuring process) may be referred to as "real-time degradation monitoring".

The situation in which the degradation monitoring is available or needed may include a situation in which the display device is not used by a user or a situation in which an input related to screen setting from a user is detected.

The real-time degradation compensation system 1000 can predict at least on degradation level of at least one subpixel SP in the one or more optical areas (OA1, OA2) based on measurements of the respective luminance of the one or more optical areas (OA1, OA2). Herein, the process of predicting the degradation level of the subpixel SP (degradation prediction process) may also be referred to as "degradation modeling optimization process".

The real-time degradation compensation system 1000 can compensate for respective degradation of subpixels included in each of the non-optical area NA and the one or more optical areas (OA1, OA2) based on the predicted at least one degradation level.

Referring to FIG. 10, in some embodiments, the real-time degradation compensation system 1000 can include a degradation monitoring situation determination circuit 1010, a display control circuit 1020, a real-time degradation modeling circuit 1030, a degradation compensator 1040, and the like.

The degradation monitoring situation determination circuit 1010 can be configured to determine whether degradation monitoring is available or needed.

The display control circuit 1020 can be configured to control so that an image cannot be displayed on the display panel responsive to determining degradation monitoring is available or needed.

The real-time degradation modeling circuit 1030 can be configured to control the one or more optical electronic devices (11, 12) to execute an image capturing operation or a sensing operation responsive to determining that the degradation monitoring is available or needed, and configured to predict degradation levels of subpixels in the one or more optical areas (OA1, OA2) based on the measured luminance of the one or more optical electronic devices (11, 12) through a result of the execution of the image capturing operation or the sensing operation.

The degradation compensator 1040 can be configured to compensate for the degradation of subpixels included in each of the non-optical area NA and the one or more optical areas (OA1, OA2) based on the predicted degradation levels.

Referring to FIG. 10, in one embodiment, each of the degradation monitoring situation determination circuit 1010, the display control circuit 1020, the real-time degradation modeling circuit 1030, and the degradation compensator 1040 included in the real-time degradation compensation system 1000 may be included in, or integrated with, the display controller 240.

In another embodiment, at least one of the degradation monitoring situation determination circuit 1010, the display control circuit 1020, the real-time degradation modeling circuit 1030, and the degradation compensator 1040 may be included in, or integrated with, a host system 250 interlinking with the display controller 240.

Referring to FIG. 11, the real-time degradation modeling circuit 1030 included in the real-time degradation compensation system 1000 can include a subpixel usage calculator 1110, a luminance measurement device 1120, a subpixel degradation predictor 1130, and a degradation modeling lookup table manager 1140. The subpixel usage calculator 1110, the luminance measurement device 1120, the subpixel degradation predictor 1130, and the degradation modeling lookup table manager 1140 may be software modules executed by hardware such as computer processor for example.

The sub-pixel usage calculator 1110 can be configured to calculate the usage of sub-pixels in one or more optical areas (OA1, OA2).

The luminance measuring device 1120 can be configured to measure respective luminance of the one or more optical areas (OA1, OA2) using a result of the execution of the image capturing operation or the sensing operation of the one or more optical electronic devices (11, 12).

The subpixel degradation predictor 1130 can be configured to predict degradation levels of the sub-pixels in the one or more optical areas (OA1, OA2) based on the calculated usage and the measured luminance.

The degradation modeling lookup table manager 1140 can be configured to manage, or update, a degradation modeling lookup table based on the predicted degradation levels.

In some embodiments, the real-time degradation compensation system 1000 of the display device 100 can perform degradation compensation based on luminance measured through the one or more optical areas (OA1, OA2) that at least partially overlap the one or more optical electronic devices (11, 12) using the one or more optical electronic devices (11, 12) located under, or at a lower portion of, the display panel 110.

More specifically, in some embodiments, the real-time degradation compensation system 1000 of the display device 100 can monitor information on respective degradation of subpixels disposed in the one or more optical areas (OA1, OA2) based on luminance measured through the one or more optical areas (OA1, OA2) using the one or more optical electronic devices (11, 12).

In some embodiments, the real-time degradation compensation system 1000 of the display device 100 can predict information on respective degradation of a plurality of sub-pixels SP disposed on the display panel 110 based on the degradation information obtained by monitoring subpixels disposed in the one or more optical areas (OA1, OA2), generate a real-time degradation modeling lookup table based on this, and perform degradation compensation based on the generated degradation modeling lookup table.

Among typical degradation compensation methods, an optical compensation method using a camera, etc. has been introduced, but such an optical compensation method has been used in the manufacturing process of the display device. In such a typical optical compensation method, since there is no way to apply the optical compensation method after a corresponding display device is manufactured and rolled out, therefore, accurate compensation for degradation developed after the display device has been rolled out cannot be provided.

In comparison with this, the display device 100 according to embodiments of the present disclosure can perform degradation compensation in real time, even in a situation where the display device 100 is used after having been rolled out, by monitoring degradation levels of the sub-pixels SP disposed in the one or more optical areas (OA1, OA2) using the one or more optical electronic devices (11, 12) that at least partially overlap the one or more optical areas (OA1, OA2) in the display area DA.

Referring to FIG. 12, in some embodiments, to compensate for degradation in real time, the real-time degradation compensation system 1000 of the display device 100 can monitor degradation levels of sub-pixels SP in the first optical area OA1 at least partially overlapping the first optical electronic device 11 using the first optical electronic device 11 overlapping the first optical area OA1.

The first optical electronic device 11 may be, for example, a camera for capturing objects or images in a front direction of the display panel 110 through the first optical area OA1.

Referring to FIG. 13, in some embodiments, to compensate for degradation in real time, the real-time degradation compensation system 1000 of the display device 100 can monitor degradation levels of sub-pixels SP in the second optical area OA2 at least partially overlapping the second optical electronic device 12 using the second optical electronic device 12 overlapping the second optical area OA2.

The second optical electronic device 12 may be, for example, a sensor such as a proximity sensor, an illuminance sensor, and/or the like. For example, the luminance sensor may be an illuminance sensor for detecting the brightness of external light transmitting through the second optical area OA2.

Referring to FIGS. 12 and 13, in some embodiments, to compensate for degradation in real time, the real-time degradation compensation system 1000 of the display device 100 can monitor degradation levels of sub-pixels SP in the first optical area OA1 at least partially overlapping the first optical electronic device 11 using the first optical electronic device 11 overlapping the first optical area OA1, and together with this, monitor degradation levels of sub-pixels SP in the second optical area OA2 at least partially overlapping the second optical electronic device 12 using the second optical electronic device 12 overlapping the second optical area OA2.

Hereinafter, the real-time degradation compensation method performed by the real-time degradation compensation system 1000 of the display device 100 as briefly described above will be described in more detail.

Figure 14:
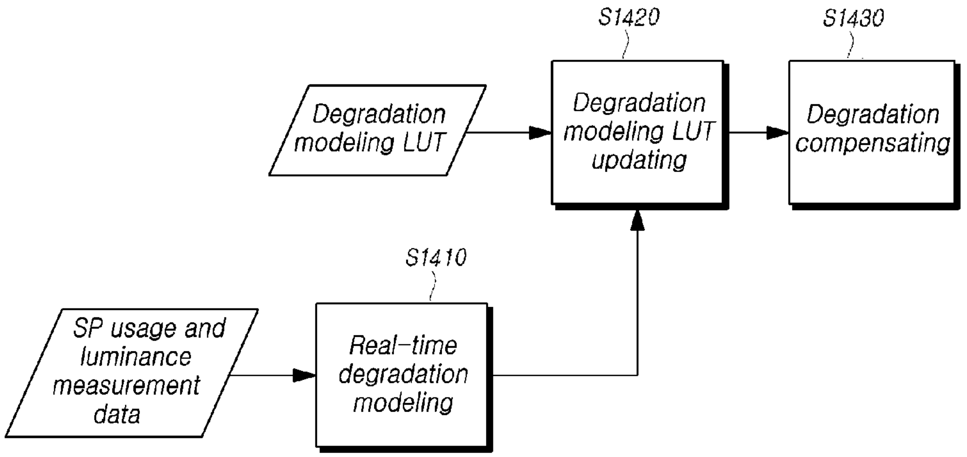
FIG. 14 illustrates a real-time degradation compensation process in the display device according to embodiments of the present disclosure.

FIG. 14 illustrates a real-time degradation compensation process applied to the display device 100 according to embodiments of the present disclosure.

The display device 100 according to embodiments of the present disclosure can include a display panel 110 for displaying images, one or more optical electronic devices (11, 12), a data driving circuit 220, and the like.

The display panel 110 can include a display area DA in which an image is displayed and a non-display area NDA located outside the display area DA.

The display area OA may include a plurality of sub-pixels SP and a plurality of light emitting areas EP corresponding to the plurality of sub-pixels SP.

For example, the one or more optical electronic devices (11, 12) may be located under, at a lower portion of, the display panel 110.

The data driving circuit 220 can output data voltages Vdata corresponding to image data Data input from the display controller 240 to a plurality of data lines DL disposed in the display panel 110.

The display area DA may include one or more optical areas (OA1, OA2) at least partially overlapping with the one or more optical electronic devices (11, 12), and a non-optical area NA located outside of the one or more optical areas (OA1, OA2).

The one or more optical areas (OA1, OA2) may include a plurality of first light emitting areas EA of a plurality of light emitting areas EP included in the entire display area DA, and may further include a plurality of transmission areas (TA1, TA2).

The non-optical area NA may include a plurality of second light emitting areas EA of the plurality of light emitting areas EP included in the entire display area DA.

The one or more optical electronic devices (11, 12) may be located under, or at a lower portion of, the display panel 110, and may overlap all, one or more, of the plurality of first light emitting areas EA in the one or more optical areas (OA1, OA2).

In some embodiments, the real-time degradation compensation system 1000 can perform a real-time degradation compensation operation when the display device 100 is not used by a user, or when an input related to screen setting such as image quality setting from a user is detected.

For example, during one of a first period in which the display device is not used by a user and a second period proceeded by an input related to screen setting from the user, the one or more optical electronic devices (11, 12) can be configured to perform an image capturing operation or a sensing operation through the one or more optical areas (OA1, OA2).

The one or more optical electronic devices (11, 12) may include, for example, one or more of an image capture device such as a camera (an image sensor), and/or the like, and a sensor such as a proximity sensor, an illuminance sensor, and/or the like. For example, the one or more optical electronic devices (11, 12) may include one or more of first and second optical electronic devices (11, 12).

In one embodiment, the first optical electronic device 11 may be a camera, and the second optical electronic device 12 may be a sensor such as a proximity sensor, an illuminance sensor, and/or the like. The camera can capture objects or images on the front surface of the first optical area OA1 by performing an image capturing operation using external light transmitting the first optical area OA1. The luminance sensor can perform the sensing operation using external light transmitting the first optical area OA1. For example, the luminance sensor may be an illuminance sensor for detecting the brightness of external light transmitting the second optical area OA2.

For example, the first period of the first period and the second period during which the real-time degradation compensation operation can be performed may be any one of a period in which the power of the display device 100 is turned off, a period in which the display device 100 is turned on, a period in which the display device 100 is in the lock screen state, and a period in which the display device 100 is in the standby mode state.

For example, the second period of the first period and the second period during which the real-time degradation compensation operation can be performed may be a period proceeded by an input related to a screen setting from a user for degradation compensation.

In some embodiments, to compensate for degradation in real time, the real-time degradation compensation system 100 of the display device 100 can store a degradation modeling lookup table LUT including information on an initial luminance value L0 in advance.

In some embodiments, to compensate for degradation in real time, the real-time degradation compensation system 100 of the display device 100 can perform real-time degradation modeling by monitoring (sensing) a degradation level in the current situation (S1410).

In some embodiments, the real-time degradation compensation system 1000 of the display device 100 can measure respective luminance of the one or more optical areas (OA1, OA2) using the one or more optical electronic devices (11, 12), and perform real-time degradation modeling based on the luminance data obtained through the measurement (S1410).

In some embodiments, in order to increase the accuracy of real-time degradation modeling, the real-time degradation compensation system 1000 of the display device 100 can perform the real-time degradation modeling by accumulating the usage of subpixels, and using the accumulated usage of subpixels together with the luminance data obtained through the measurement (S1410).

In some embodiments, the real-time degradation compensation system 1000 of the display device 100 can assess degradation levels (degradation degrees) of subpixels SP disposed in the one or more optical areas (OA1, OA2) by performing the real-time degradation modeling, and update a stored current degradation modeling lookup table that has been updated previously or set initially based on the assessed degradation levels (S1420). The degradation modeling lookup table may include, for example, information on degradation levels of one or more sub-pixels SP.

In some embodiments, the display device 100 may include an updated degradation modeling lookup table LUT changed after the image capturing operation or the sensing operation of the one or more optical electronic devices (11, 12) through the one or more optical areas (OA1, OA2) is performed.

In some embodiments, the real-time degradation compensation system 1000 of the display device 100 can perform degradation compensation using the updated degradation modeling lookup table LUT (S1430).

The degradation compensation can be executed by changing image data Data or data voltages Vdata for image display.

Accordingly, in the display device 100 according to embodiments of the present disclosure, image data Data or data voltages Vdata for image display can be changed after the image capturing operation or the sensing operation of the one or more optical electronic devices (11, 12) through the one or more optical areas (OA1, OA2) is performed.

In some embodiments, using the degradation modeling lookup table updated according to information obtained by monitoring degradation levels (degradation degrees) of subpixels SP disposed in the one or more optical areas (OA1, OA2), the real-time degradation compensation system 1000 of the display device 100 can compensate for respective degradation of the subpixels SP disposed in the one or more optical areas (OA1, OA2), and/or compensate for respective degradation of subpixels disposed in the non-optical area NA. For example, a result of the monitoring of degradation levels (degradation degrees) of subpixels SP disposed in the one or more optical areas (OA1, OA2) may represent degradation levels of subpixels disposed in the non-optical area NA.

In order to execute degradation compensation, the changed image data Data or the changed data voltages Vdata can be supplied to sub-pixels SP disposed in the non-optical area NA.

In another example, in order to execute degradation compensation, the changed image data Data or the changed data voltages Vdata can be supplied to sub-pixels SP disposed in the one or more optical areas (OA1, OA2).

In some embodiments, the real-time degradation compensation system 1000 can perform the degradation monitoring operation (degradation sensing operation) using the one or more optical areas (OA1, OA2) in a situation where a specific image is displayed.

For example, in the real-time degradation compensation system 1000, when the one or more optical electronic devices (11, 12) perform the image capturing operation or the sensing operation through the one or more optical areas (OA1, OA2), a specific image (e.g., a predetermined image) may be displayed in the whole of the display area DA or in the one or more optical areas (OA1, OA2).

The specific image may be an image representing when an initial luminance value L0 is obtained. For example, the specific image may be a monochromatic image of a specific color.

For example, at a first time (a first degradation monitoring time), the specific image displayed in the whole of the display area DA or in the one or more optical areas (OA1, OA2) may have a first luminance. For example, at a second time (a second degradation monitoring time) following the first time (the first degradation monitoring time), the specific image displayed in the whole of the display area DA or in the one or more optical areas (OA1, OA2) may have a second luminance. The second luminance may be lower than the first luminance due to degradation.

In some embodiments, the real-time degradation compensation system 1000 can perform the degradation monitoring operation (degradation sensing operation) using the one or more optical areas (OA1, OA2) in a dark environment.

Accordingly, when the one or more optical electronic devices (11, 12) perform the image capturing operation or the sensing operation through the one or more optical areas (OA1, OA2), a luminance of the environment of the display device 100 may be less than a threshold luminance. Here, the threshold luminance may be a maximum luminance value enabling accurate degradation monitoring (i.e., accurate luminance measurement).

Hereinafter, the real-time degradation compensation method according to embodiments of the present disclosure described above will be described in more detail with reference to FIGS. 15 and 16.

Figure 15:
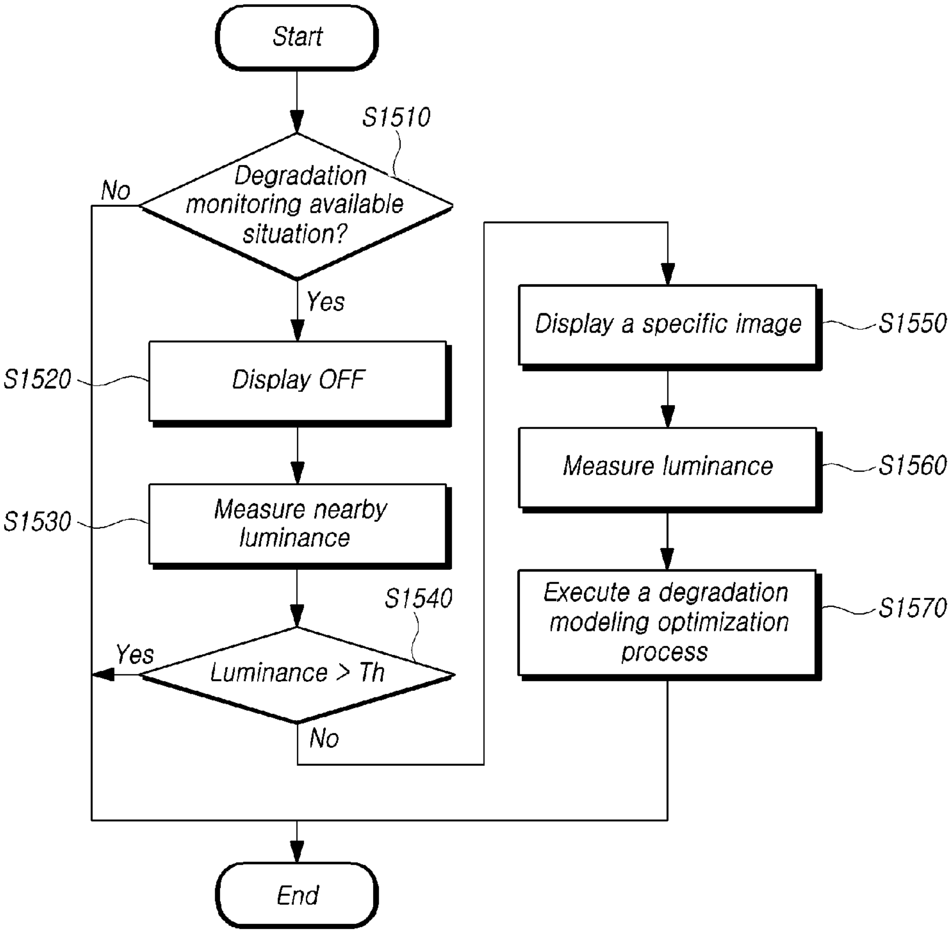
FIG. 15 is a flow chart of a method of monitoring degradation in real time in the display device according to embodiments of the present disclosure.

FIG. 15 is a flow chart of the real-time degradation monitoring method applied to the display device 100 according to embodiments of the present disclosure. FIG. 16 is a flow chart of the real-time degradation compensation method applied to the display device 100 according to embodiments of the present disclosure. FIG. 17 is a graph representing a degree of changed degradation by degradation monitoring optimization based on the real-time degradation monitoring in the display device 100 according to embodiments of the present disclosure.

The display device 100 according to embodiments of the present disclosure can include a display panel 110 including a display area DA including a plurality of light emitting areas EP corresponding to a plurality of subpixels SP, and a non-display area NA located outside of the display area DA, one or more optical electronic devices (11, 12), and a data driving circuit configured to supply a data voltage corresponding to input image data to the display panel.

The display area DA may include one or more optical areas (OA1, OA2) at least partially overlapping with the one or more optical electronic devices (11, 12), and a non-optical area NA located outside of the one or more optical areas (OA1, OA2).

The one or more optical areas (OA1, OA2) may include a plurality of first light emitting areas EA of the plurality of light emitting areas EP and a plurality of transmission areas. The non-optical area NA may include a plurality of second light emitting areas EA of the plurality of light emitting areas EP The one or more optical electronic devices (11, 12) may overlap all, one or more, of the plurality of first light emitting areas EA in the one or more optical areas (OA1, OA2).

Referring to FIG. 15, in some embodiments, the method of operating the display device 100 can include a step S1510 of determining whether the current situation is determined to be a situation in which degradation monitoring is available or needed according to a predefined condition by the real-time degradation compensation system 1000, and when the current situation is determined to be a situation in which degradation monitoring is available or needed, during a period in which degradation monitoring is available, a step S1560 of measuring luminance through one or more optical areas (OA1, OA2) using one or more optical electronic devices (11, 12) by the real-time degradation compensation system 1000.

For example, in step S1510, to determine whether the current situation is a situation in which degradation monitoring is available or needed, the real-time degradation compensation system 1000 can determine whether the display device 100 is in a first period in which the display device 100 is not used by a user or a second period proceeded by an input related to screen setting from the user.

For example, in step S1560, in order for the real-time degradation compensation system 1000 to measure luminance through the one or more optical areas (OA1, OA2) using the one or more optical electronic devices (11, 12), the one or more optical electronic devices (11, 12) can perform the image capturing operation or the sensing operation through the one or more optical areas (OA1, OA2) during the first period or the second period, which is a period in which degradation monitoring is available.

For example, the first period of the first and second periods in which the degradation monitoring is available may be any one of a period in which the power of the display device 100 is turned off, a period in which the display device 100 is turned on, a period in which the display device 100 is in the lock screen state, and a period in which the display device 100 is in the standby mode state. The second period, which is a period in which the degradation monitoring is available, may be a period proceeded by an input from a user related to screen setting for degradation compensation.

Referring to FIG. 15, in some embodiments, the method of operating the display device 100 may further include a step S1550 of displaying a specific image on the whole of the display area DA or on one or more optical areas (OA1, OA2) prior to step S1560.

In step S1560, to measure luminance while the specific image is displayed on the whole of the display area DA or on one or more optical areas (OA1, OA2), the one or more optical electronic devices (11, 12) can perform the image capturing operation or the sensing operation through the one or more optical areas (OA1, OA2).

Referring to FIG. 15, in some embodiments, the method of operating the display device 100 may further include a step S1520 of stopping the displaying of an image on the display panel 110, which is performed between the step S1510 of determining whether the current situation is a situation in which the degradation monitoring is available or needed and the step S1550 of displaying the specific image, a step S1530 of measuring luminance near the display device 100 through the image capturing operation or the sensing operation of the one or more optical electronic devices (11, 12), and a step S1540 of determining whether the nearby luminance is less than (or greater than) or equal to a threshold luminance.

Referring to FIG. 15, in step S1540, when it is determined that the nearby luminance is less than or equal to the threshold luminance, the step S1550 of displaying a specific image may proceed.

Referring to FIG. 15, in step S1540, when it is determined that the nearby luminance greater than the threshold luminance, the display device 100 may not perform the degradation monitoring operation in actual.

Referring to FIG. 15, in some embodiments, after step S1560, the method of operating the display device 100 may further include a step S1570 of initiating a degradation modeling optimization process using the measurement of the nearby luminance.

Hereinafter, the real-time degradation monitoring method according to embodiments of the present disclosure, the degradation modeling optimization process using a result of the real-time degradation monitoring, and a degradation compensation performed based on the degradation modeling optimization will be described in more detail with reference to FIG. 16.

In some embodiments, the real-time degradation compensation system 1000 can perform real-time degradation monitoring by using usage of one or more subpixels and a measurement result of luminance together.

Figure 16:
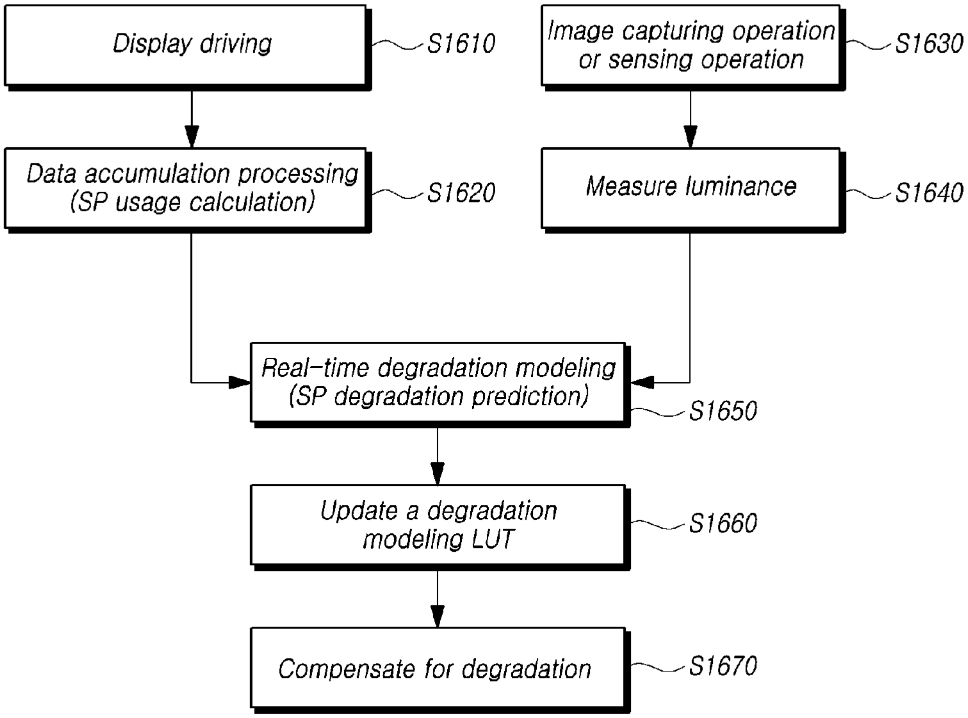
FIG. 16 is a flow chart of a method of compensating for degradation in real time in the display device according to embodiments of the present disclosure.
Figure 17:
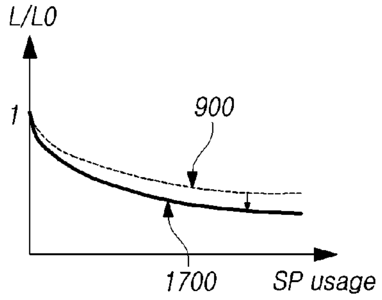
FIG. 17 is a graph representing a degree of changed degradation by degradation monitoring optimization based on the real-time degradation monitoring in the display device according to embodiments of the present disclosure.

Referring to FIG. 16, in some embodiments, when the display driving for displaying an image is performed (step S1610), the real-time degradation compensation system 1000 can calculate respective usage of one or more subpixels (SP usage) (step S1620) by performing data accumulation processing based on image data or frame data supplied to the one or more sub-pixels SP.

Referring to FIG. 16, in some embodiments, the one or more optical electronic devices (11, 12) of the real-time degradation compensation system 1000 can perform the image capturing operation or the sensing operation (step S1630).

Referring to FIG. 16, in some embodiments, when a specific image is displayed by one or more sub-pixels SP disposed in the one or more optical areas (OA1, OA2), the real-time degradation compensation system 1000 can measure respective luminance of the one or more sub-pixels SP disposed in the one or more optical areas (OA1, OA2) (step S1640) through the image capturing operation or the sensing operation (step S1630) of the one or more optical electronic devices (11, 12) overlapping the one or more optical areas (OA1, OA2).

Referring to FIG. 16, in some embodiments, the real-time degradation compensation system 1000 can assess degradation levels of one or more sub-pixels SP disposed in the one or more optical areas (OA1, OA2) by using luminance measurement data obtained through the sub-pixel usage calculated through the data accumulation processing and the luminance measurement result, and predict degradation levels of sub-pixels SP included in the display panel 110 (step S1650) based on the assessed degradation levels.

Referring to FIG. 16, in some embodiments, the real-time degradation compensation system 1000 can execute real-time degradation modeling (step S1650) based on the predicted degradation levels of the sub-pixels SP included in the display panel 110.

The execution of the real-time degradation modeling may mean obtaining information on the predicted degradation levels of the sub-pixels SP of the display panel 110.

Referring to FIG. 16, in some embodiments, the real-time degradation compensation system 1000 can update a current degradation modeling lookup table LUT (step S1660) that has been managed until now after the real-time degradation modeling (step S1650) is executed.

Referring to FIG. 17, in the step S1660 of updating the degradation modeling lookup table, the degradation graph 900 that can be expressed according to the current degradation modeling lookup table may be modified to a graph 1700 that that can be expressed according to the updated degradation modeling lookup table.

The current degradation graph 900 or the modified degradation graph 1700 may be graphs denoting luminance indexes of one or more sub-pixels SP according to the usage of the one or more sub-pixels. Here, a luminance index of a sub-pixel SP may be a value L/L0 obtained by dividing a measured luminance value L of the subpixel SP by an initial luminance value L0 of the subpixel SP. The luminance index L/L0 of the subpixel SP may be a value (a rational number) of 1 or less.

Referring to FIGS. 15 and 16, the steps S1650 and S1660 may be included in the step S1570 of executing the degradation modeling optimization process that proceeds after the luminance measurement step S1560 in FIG. 15.

According to this, the step S1660 of updating a current degradation modeling lookup table may proceed after the image capturing operation or the sensing operation of the one or more optical electronic devices (11, 12) through the one or more optical areas (OA1, OA2) is performed in the luminance measurement step S1560 in FIG. 15.

Referring to FIG. 16, after the step S1660 of updating the degradation modeling lookup table, a step S1670 of changing image data or data voltages may proceed to execute degradation compensation based on the updated degradation modeling lookup table. Here, one or more changed data voltages may be supplied to one or more sub-pixels SP in the non-optical area NA or one or more sub-pixels SP in one or more optical areas (OA1, OA2).

The display device 100 according to the embodiments described herein can perform the real-time degradation monitoring and degradation compensation by using one or more of the first optical electronic device 11 and the second optical electronic device 12.

The real-time degradation monitoring and degradation compensation method of the display device 100 according to the embodiments described herein can use a plurality of optical electronic devices. Accordingly, the display device 100 can include a plurality of optical areas overlapping the plurality of optical electronic devices in the display area DA of the display panel 110. This will be briefly described below with reference to FIG. 18.

Figure 18:
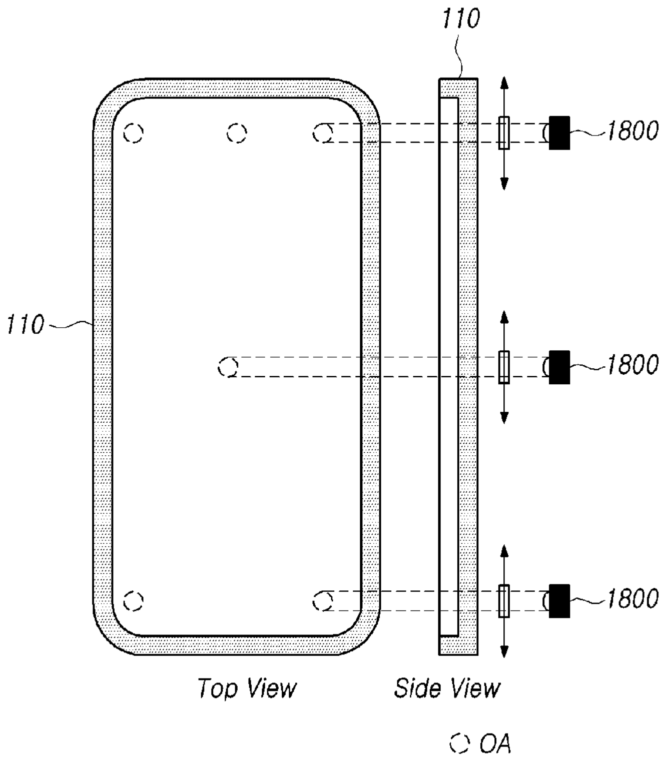
FIG. 18 illustrates structure of monitoring degradation using the plurality of optical electronic devices included in the display device according to embodiments of the present disclosure.

FIG. 18 illustrates a degradation monitoring structure of using a plurality of optical electronic devices 1800 included in the display device 100 according to embodiments of the present disclosure.

Referring to FIG. 18, the display area DA of the display panel 110 may include three or more optical areas OA. Each of the three or more optical areas OA may include light emitting areas and transmission areas. Each of the three optical areas OA may have the same structure as one of the first optical area OA1 and the second optical area OA2 described in the above embodiments.

Referring to FIG. 18, the display device 100 according to embodiments of the present disclosure can includes three or more optical and electronic devices 1800 overlapping three or more optical areas OA of the display area DA, respectively.

Referring to FIG. 18, three or more optical areas OA of the display area DA may be present at several locations in the display area DA.

As described above, when the three or more optical and electronic devices 1800 are present in several locations under, or at a lower portion of, the display panel 110, the real-time degradation compensation system 1000 can assess more accurately a degradation level in the display panel 110 by performing degradation monitoring using the three or more optical and electronic devices 1800. Accordingly, the performance of corresponding degradation compensation can be more improved.

According to the embodiments described herein, the display device 100 and the method of operating the display device 100 can be provided, the display device 100 being capable of monitoring the degradation of a subpixel in real time using one or more optical elements or devices (11, 12, 1800) even in a situation where the display device is used by a user, and capable of compensating for the degradation in real time in accordance with the result of the monitoring.

According to the embodiments described herein, the display device 100 and the method of operating the display device 100 can be provided, the display device 100 being capable of accurately compensating for the degradation of a subpixel in real time by performing degradation monitoring in real time using one or more optical electronic devices (11, 12, 1800) located under, or at a lower portion of, the display panel 110 and partially overlapping one or more optical areas (OA1, OA2, OA) included in the display area of the display panel 110.

The above description has been presented to enable any person skilled in the art to make and use the technical idea of the present invention, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present invention. The above description and the accompanying drawings provide an example of the technical idea of the present invention for illustrative purposes only. That is, the disclosed embodiments are intended to illustrate the scope of the technical idea of the present invention. Thus, the scope of the present invention is not limited to the embodiments shown, but is to be accorded the widest scope consistent with the claims. The scope of protection of the present invention should be construed based on the following claims, and all technical ideas within the scope of equivalents thereof should be construed as being included within the scope of the present invention.

What is claimed is:

1. A display device comprising:

a display panel comprising a display area including a plurality of light emitting areas corresponding to a plurality of subpixels, and a non-display area located outside of the display area;

one or more optical electronic devices located under, or at a lower portion of, the display panel; and a data driving circuit configured to supply a data voltage corresponding to input image data to the display panel, wherein the display area comprises one or more optical areas that partially overlap the one or more optical electronic devices, and a non-optical area located outside of the one or more optical areas, wherein the one or more optical areas comprises a plurality of first light emitting areas of the plurality of light emitting areas and a plurality of light transmission areas, and the non-optical area comprises a plurality of second light emitting areas of the plurality of light emitting areas, and wherein the one or more optical electronic devices overlaps at least a portion of the plurality of first light emitting areas in the one or more optical areas, and performs an image capturing operation or a sensing operation through the one or more optical areas during one of a first period in which the display device is not used or a second period proceeded by an input related to screen setting, wherein the first period is one of a period in which power of the display device is turned off, a period in which the display device is in a lock screen state, or a period in which the display device is in a standby mode state, and the second period is a period proceeded by an input related to screen setting for degradation compensation, wherein the one or more optical areas includes:

a first optical area; and a second optical area, wherein the one or more optical electronic devices includes a camera disposed in the first optical area and a luminance sensor disposed in the second optical area, wherein the camera performs the image capturing operation or the sensing operation when a luminance of an environment of the display device sensed by the luminance sensor is less than a threshold luminance, and wherein a degree of transmission of the first optical area is greater than a degree of transmission of the second optical area.

2. The display device according to claim 1, wherein the one or more optical electronic devices comprise one or more of a camera or a luminance sensor.

3. The display device according to claim 1, wherein when the camera performs the image capturing operation or the sensing operation through the first optical area, a predetermined image is displayed on an entirety of the display area or on the one or more optical areas, wherein the predetermined image has a first luminance at a first time, and has a second luminance at a second time after the first time, and wherein the second luminance is less than the first luminance.

4. The display device according to claim 1, wherein after the image capturing operation or the sensing operation of the camera through the first optical area is performed, the input image data or the data voltage are changed.

5. The display device according to claim 4, wherein the data voltage is supplied to a sub-pixel in the non-optical area.

6. The display device according to claim 4, wherein the data voltage is supplied to a sub-pixel in the one or more optical areas.

7. The display device according to claim 1, further comprising a degradation modeling lookup table that is updated after the image capturing operation or the sensing operation of the camera through the first optical area is performed.

8. The display device according to claim 1, further comprising a real-time degradation compensation system comprising:

a degradation monitoring situation determination circuit configured to determine whether degradation monitoring is available or degradation monitoring needed;

a display control circuit configured to control that an image is not displayed on the display panel responsive to determining that degradation monitoring is available or degradation monitoring is needed;

a real-time degradation modeling circuit configured to control the camera to execute the image capturing operation or the sensing operation and predict at least one degradation level of at least one subpixel in the one or more optical areas based on the measured luminance of the one or more optical areas through a result of the execution of the image capturing operation or the sensing operation; and a degradation compensator configured to perform compensate for degradation of subpixels comprised in each of the non-optical area and the one or more optical areas based on the predicted at least one degradation level.

9. The display device according to claim 8, wherein the real-time degradation modeling circuit comprises:

a subpixel usage calculator configured to calculate usage of subpixels in the one or more optical areas;

a luminance measurement device configured to measure luminance of the one or more optical areas based on the result of the execution of the image capturing operation or the sensing operation of the camera;

a subpixel degradation predictor configured to predict degradation levels of the subpixels in the one or more optical areas based on the calculated usage and the measured luminance; and a degradation modeling lookup table manager configured to manage a degradation modeling lookup table based on the predicted degradation levels.

10. A method of operating a display device comprising a display panel comprising a display area comprising a plurality of light emitting areas corresponding to a plurality of subpixels, and a non-display area located outside of the display area, a data driving circuit configured to supply a data voltage corresponding to input image data to the display panel, and one or more optical electronic devices including a camera disposed in a first optical area and a luminance sensor disposed in a second optical area that has a degree of transmission that is less than a degree of transmission of the first optical area, the method comprising:

determining whether the display device operates in a first period in which the display device is not used or a second period proceeded by an input related to screen setting; and executing an image capturing operation or a sensing operation by the camera during the first period or the second period when a luminance of an environment of the display device sensed by the luminance sensor is less than a threshold luminance, wherein the display area comprises one or more optical areas including the first optical area and the second optical area are partially overlapping the one or more optical electronic devices, and a non-optical area located outside of the one or more optical areas, wherein the one or more optical areas comprises a plurality of first light emitting areas of the plurality of light emitting areas and a plurality of light transmission areas, and the non-optical area comprises a plurality of second light emitting areas of the plurality of light emitting areas, and wherein the one or more optical electronic devices overlap at least a portion of the plurality of first light emitting areas in the one or more optical areas, wherein the first period is one of a period in which power of the display device is turned off, a period in which the display device is in a lock screen state, or a period in which the display device is in a standby mode state, and the second period is a period proceeded by an input related to screen setting for degradation compensation.

11. The method according to claim 10, further comprising displaying a predetermined image on an entirety of the display area or on the one or more optical areas prior to the execution of the image capturing operation or the sensing operation, wherein the image capturing operation or the sensing operation is performed by the camera through the first optical area while the predetermined image is displayed on the entirety of the display area or on the one or more optical areas.

12. The method according to claim 11, further comprising:

stopping the displaying of an image on the display panel, which is performed between the determining of whether the display device operates in the first period or the second period and displaying the predetermined image;

measuring luminance of an environment of the display device through the image capturing operation or the sensing operation of the camera; and determining whether the luminance is less than or equal to a threshold luminance, wherein when the luminance is less than or equal to the threshold luminance, the predetermined image is displayed.

13. A display device comprising:

a display panel including a first optical area and a non-optical area that are configured to display an image, the first optical area comprising a first plurality of light emitting areas and a first plurality of light transmission areas and a second optical area having a degree of transmission that is less than a degree of transmission of the first optical area, and the non-optical area including a second plurality of light emitting areas;

a luminance sensor disposed in the second optical area; and a camera disposed in the first optical area, the camera configured to perform an image capturing operation or sense light through the first plurality of light transmission areas of the first optical area during one of a first period in which the display device is not used or a second period proceeded by an input related to screen setting when a luminance of an environment of the display device sensed by the luminance sensor is less than a threshold luminance, the camera under the display panel or located at a lower portion of the display panel and overlapping the first optical area but not the non-optical area, wherein the first period is one of a period in which power of the display device is turned off, a period in which the display device is in a lock screen state, or a period in which the display device is in a standby mode state, and the second period is a period proceeded by an input related to screen setting for degradation compensation.

14. The display device of claim 13, wherein the sensed light corresponds to a predetermined image displayed on the display panel and a subsequent image for display on the display panel is adjusted based on the sensed light.

15. The display device of claim 13, wherein the first optical area is smaller than the non-optical area.

16. The display device of claim 13, wherein at least one of the first plurality of light transmission areas of the first optical area includes:

a plurality of insulating layers;

a first recess through the plurality of insulating layers;

a planarization layer on the plurality of insulating layers; and a second recess through a portion of the planarization layer, wherein the first recess overlaps the second recess.

17. The display device of claim 13, wherein the second optical area comprising a third plurality of light emitting areas and a second plurality of light transmission areas.

* * * * *